(12) United States Patent
Ruther et al.

(10) Patent No.: US 9,304,062 B2
(45) Date of Patent: Apr. 5, 2016

(54) SYSTEM AND METHOD FOR EXTENDING COMMUNICATION RANGE AND REDUCING POWER CONSUMPTION OF VEHICLE DIAGNOSTIC EQUIPMENT

(71) Applicant: Snap-on Incorporated, Kenosha, WI (US)

(72) Inventors: Timothy G. Ruther, Carpentersville, IL (US); Carl J. Krzystofczyk, Mount Prospect, IL (US)

(73) Assignee: Snap-on Incorporated, Kenosha, WI (US)

( * ) Notice: Subject to any disclaimer, the term of this patent is extended or adjusted under 35 U.S.C. 154(b) by 82 days.

(21) Appl. No.: 14/022,749

(22) Filed: Sep. 10, 2013

(65) Prior Publication Data

US 2014/0019000 A1 Jan. 16, 2014

Related U.S. Application Data

(63) Continuation of application No. 12/859,040, filed on Aug. 18, 2010, now Pat. No. 8,560,168.

(51) Int. Cl.
*G01M 17/00* (2006.01)
*G01M 17/007* (2006.01)
(Continued)

(52) U.S. Cl.
CPC .......... *G01M 17/007* (2013.01); *B60R 16/0315* (2013.01); *G07C 5/008* (2013.01); *G07C 5/0825* (2013.01)

(58) Field of Classification Search
CPC .................... B60R 16/0315; H04W 52/24
USPC .................. 701/34.3; 455/522, 574
See application file for complete search history.

(56) References Cited

U.S. PATENT DOCUMENTS 2,587,079 A 2/1952 Woods et al.
2,680,210 A 6/1954 Miller et al.
(Continued)

FOREIGN PATENT DOCUMENTS

CA 2373157 A1 3/2000
DE 195 43 784 A1 5/2007
(Continued)

OTHER PUBLICATIONS

Bluetooth Sig Inc., Bluetooth Specification Version 4.0, vol. 2, "Core System Package [BR/EDR Controller Volume]," Part C "Link Manager Protocol Specification," Section 4.2 "Security", pp. 247-275, Jun. 30, 2010.
(Continued)

*Primary Examiner* — Hunter Wilder
(74) *Attorney, Agent, or Firm* — McDonnell Boehnen Hulbert & Berghoff LLP

(57) ABSTRACT

Disclosed are systems and methods for transmitting obtained vehicle diagnostic data to a separate display device. The method includes a first vehicle diagnostic device obtaining vehicle diagnostic data via a vehicle interface to a diagnostic port of a vehicle, determining whether a direct wireless connection with one or more display devices is available, and determining whether an indirect wireless connection with the one or more display devices is available via a second separate vehicle diagnostic device. Responsive to a further determination, the vehicle diagnostic device may transmit the obtained diagnostic data to the one or more display devices via the second separate vehicle diagnostic device. The further determination may be based on one or more of wireless connectivity status, power level status, transmission power requirements, or other facts or determinations.

21 Claims, 12 Drawing Sheets

(51) Int. Cl.
*B60R 16/03* (2006.01)
*G07C 5/00* (2006.01)
*G07C 5/08* (2006.01)

(56) References Cited

U.S. PATENT DOCUMENTS

| | | | |
|---|---|---|---|
| 4,058,826 A | 11/1977 | Schneider | |
| 4,072,851 A | 2/1978 | Rose | |
| 4,104,725 A | 8/1978 | Rose et al. | |
| 4,113,980 A | 9/1978 | Bell | |
| 4,257,104 A | 3/1981 | Martin et al. | |
| 4,270,174 A | 5/1981 | Karlin et al. | |
| 4,404,639 A | 9/1983 | McQuire et al. | |
| 4,441,359 A | 4/1984 | Ezoe | |
| 4,602,127 A | 7/1986 | Neely et al. | |
| 4,774,438 A | 9/1988 | Rogers et al. | |
| 4,814,896 A | 3/1989 | Heitzman et al. | |
| 4,853,850 A | 8/1989 | Krass, Jr. et al. | |
| 4,962,456 A | 10/1990 | Abe et al. | |
| 5,157,610 A | 10/1992 | Asano et al. | |
| 5,160,892 A | 11/1992 | Makhija et al. | |
| 5,317,304 A | 5/1994 | Choi | |
| 5,365,436 A | 11/1994 | Schaller et al. | |
| 5,373,458 A | 12/1994 | Bishay et al. | |
| 5,396,168 A | 3/1995 | Heep et al. | |
| 5,417,222 A | 5/1995 | Dempsey et al. | |
| 5,432,904 A | 7/1995 | Wong | |
| 5,442,553 A | 8/1995 | Parrillo | |
| 5,465,207 A | 11/1995 | Boatwright et al. | |
| 5,506,772 A | 4/1996 | Kubozono et al. | |
| 5,507,288 A | 4/1996 | Bocker et al. | |
| 5,521,443 A | 5/1996 | Imura et al. | |
| 5,532,927 A | 7/1996 | Pink et al. | |
| 5,541,840 A | 7/1996 | Gurne et al. | |
| 5,583,912 A | 12/1996 | Schillaci et al. | |
| 5,592,383 A | 1/1997 | Rogers et al. | |
| 5,687,717 A | 11/1997 | Halpern et al. | |
| 5,758,300 A | 5/1998 | Abe | |
| 5,766,020 A | 6/1998 | Hughes | |
| 5,836,666 A | 11/1998 | Aoyama et al. | |
| 5,850,209 A | 12/1998 | Lemke et al. | |
| 5,884,202 A | 3/1999 | Arjomand | |
| 5,899,947 A | 5/1999 | Hall et al. | |
| 5,923,161 A | 7/1999 | Frankovitch, Jr. et al. | |
| 6,021,366 A | 2/2000 | Fieramosca et al. | |
| 6,055,468 A | 4/2000 | Kaman et al. | |
| 6,067,486 A | 5/2000 | Aragones et al. | |
| 6,094,609 A | 7/2000 | Arjomand | |
| 6,134,489 A | 10/2000 | Smedley | |
| 6,140,811 A | 10/2000 | Little | |
| 6,169,943 B1 | 1/2001 | Simon et al. | |
| 6,178,527 B1 | 1/2001 | Vidales | |
| 6,179,214 B1 | 1/2001 | Key et al. | |
| 6,181,563 B1 | 1/2001 | Shimbo et al. | |
| 6,188,384 B1 | 2/2001 | Sullivan et al. | |
| 6,192,303 B1 | 2/2001 | Takakura et al. | |
| 6,195,617 B1 | 2/2001 | Miller | |
| 6,222,374 B1 | 4/2001 | Shoemaker | |
| 6,294,982 B1 | 9/2001 | Hooks et al. | |
| 6,311,138 B2 | 10/2001 | Miller | |
| 6,314,422 B1 | 11/2001 | Barker et al. | |
| 6,321,151 B1 | 11/2001 | Shultz | |
| 6,356,823 B1 | 3/2002 | Iannotti et al. | |
| 6,360,551 B1 | 3/2002 | Renders | |
| 6,374,315 B1 | 4/2002 | Okada et al. | |
| 6,385,300 B1 | 5/2002 | Mohammadian et al. | |
| 6,401,049 B1 | 6/2002 | Ehmer | |
| 6,416,471 B1 | 7/2002 | Kumar et al. | |
| 6,477,478 B1 | 11/2002 | Jones et al. | |
| 6,487,478 B1 | 11/2002 | Azzaro et al. | |
| 6,609,050 B2 | 8/2003 | Li | |
| 6,622,070 B1 | 9/2003 | Wacker et al. | |
| 6,640,166 B2 | 10/2003 | Liebl et al. | |
| 6,662,123 B2 | 12/2003 | Maeckel et al. | |
| 6,693,367 B1 | 2/2004 | Schmeisser et al. | |
| 6,711,524 B2 | 3/2004 | Wolf et al. | |
| 6,745,151 B2 | 6/2004 | Marko et al. | |
| 6,748,335 B2 | 6/2004 | Pickerd | |
| 6,757,521 B1 | 6/2004 | Ying | |
| 6,778,931 B1 | 8/2004 | Letts et al. | |
| 6,789,007 B2 | 9/2004 | Ellis et al. | |
| 6,802,032 B1 | 10/2004 | Budinger et al. | |
| 6,807,469 B2 | 10/2004 | Funkhouser et al. | |
| 6,807,496 B2 | 10/2004 | Pickerd | |
| 6,822,639 B1 | 11/2004 | Silverbrook et al. | |
| 6,823,243 B2 | 11/2004 | Chinnadurai et al. | |
| 6,844,823 B2 | 1/2005 | Hooks et al. | |
| 6,847,916 B1 | 1/2005 | Ying | |
| 6,873,940 B1 | 3/2005 | Kamatani | |
| 6,947,043 B1 | 9/2005 | Klingman et al. | |
| 6,957,128 B1 | 10/2005 | Ito et al. | |
| 6,959,235 B1 | 10/2005 | Abdel-Malek et al. | |
| 6,972,669 B2 | 12/2005 | Saito et al. | |
| 6,982,653 B2 | 1/2006 | Voeller et al. | |
| 6,988,053 B2 | 1/2006 | Namaky | |
| 7,020,546 B2 | 3/2006 | Nagai et al. | |
| 7,023,332 B2 | 4/2006 | Saito et al. | |
| 7,073,714 B2 | 7/2006 | Namaky et al. | |
| 7,124,058 B2 | 10/2006 | Namaky et al. | |
| 7,155,321 B2 | 12/2006 | Bromley et al. | |
| 7,200,483 B1 | 4/2007 | Kavadeles | |
| 7,224,262 B2 | 5/2007 | Simon et al. | |
| 7,251,552 B2 | 7/2007 | Schmeisser et al. | |
| 7,254,550 B2 | 8/2007 | Reichwein et al. | |
| 7,269,482 B1 | 9/2007 | Shultz et al. | |
| 7,272,476 B2 | 9/2007 | Ortiz et al. | |
| 7,281,663 B2 | 10/2007 | Schmidt et al. | |
| 7,294,906 B2 | 11/2007 | Ukaji | |
| 7,327,228 B2 | 2/2008 | Min et al. | |
| 7,336,082 B1 | 2/2008 | Mofield et al. | |
| 7,350,159 B2 | 3/2008 | Cancilla et al. | |
| 7,363,129 B1 | 4/2008 | Barnicle et al. | |
| 7,383,318 B2 | 6/2008 | Craik | |
| 7,444,216 B2 | 10/2008 | Rogers et al. | |
| 7,504,926 B2 | 3/2009 | Bessho et al. | |
| 7,530,949 B2 | 5/2009 | Al Ali et al. | |
| 7,535,466 B2 | 5/2009 | Sampsell et al. | |
| 7,580,781 B2 | 8/2009 | Mindeman | |
| 7,613,554 B2 | 11/2009 | Rollinger et al. | |
| 7,634,337 B2 | 12/2009 | Brozovich et al. | |
| 7,648,062 B2 | 1/2010 | Corniot | |
| 7,702,437 B2 | 4/2010 | Gilbert | |
| 7,711,462 B2 | 5/2010 | Daniels et al. | |
| 7,737,860 B2 | 6/2010 | Banta et al. | |
| 7,751,955 B2 | 7/2010 | Chinnadurai et al. | |
| 8,019,503 B2 | 9/2011 | Andreasen et al. | |
| 8,095,261 B2 | 1/2012 | Howell et al. | |
| 8,370,018 B2 | 2/2013 | Andreasen et al. | |
| 8,412,401 B2 | 4/2013 | Bertosa et al. | |
| 8,463,953 B2 | 6/2013 | Davis et al. | |
| 8,560,168 B2 | 10/2013 | Ruther et al. | |
| 8,670,437 B2 | 3/2014 | Walker et al. | |
| 2001/0001850 A1 | 5/2001 | Miller | |
| 2002/0007237 A1 | 1/2002 | Phung et al. | |
| 2002/0040261 A1 | 4/2002 | Nakamoto et al. | |
| 2002/0077780 A1 | 6/2002 | Liebl et al. | |
| 2003/0020759 A1 | 1/2003 | Cancilla et al. | |
| 2003/0034767 A1 | 2/2003 | Lipscomb et al. | |
| 2003/0036832 A1 | 2/2003 | Kokes et al. | |
| 2003/0058243 A1 | 3/2003 | Faust et al. | |
| 2003/0088346 A1 | 5/2003 | Calkins et al. | |
| 2003/0122671 A1 | 7/2003 | Jespersen | |
| 2003/0165127 A1* | 9/2003 | Fujiwara et al. | 370/335 |
| 2003/0208328 A1 | 11/2003 | Pickerd | |
| 2003/0208330 A1 | 11/2003 | Pickerd | |
| 2003/0222873 A1 | 12/2003 | Ritter | |
| 2004/0054503 A1 | 3/2004 | Namaky | |
| 2004/0172177 A1 | 9/2004 | Nagai et al. | |
| 2005/0083965 A1 | 4/2005 | Sodergren | |
| 2005/0094588 A1* | 5/2005 | Wentink | 370/315 |
| 2005/0152294 A1 | 7/2005 | Yu et al. | |
| 2005/0157732 A1 | 7/2005 | Joy et al. | |
| 2005/0171662 A1* | 8/2005 | Strege et al. | 701/33 |
| 2005/0182537 A1 | 8/2005 | Tefft et al. | |

(56) References Cited

U.S. PATENT DOCUMENTS

| | | |
|---|---|---|
| 2005/0267655 A1 | 12/2005 | Gessner |
| 2006/0025897 A1 | 2/2006 | Shostak et al. |
| 2006/0036355 A1 | 2/2006 | Schaar et al. |
| 2006/0066504 A1 | 3/2006 | Sampsell et al. |
| 2006/0078175 A1 | 4/2006 | Brozovich |
| 2006/0095230 A1 | 5/2006 | Grier et al. |
| 2006/0101311 A1 | 5/2006 | Lipscomb et al. |
| 2006/0106508 A1 | 5/2006 | Liebl et al. |
| 2006/0149434 A1 | 7/2006 | Bertosa et al. |
| 2006/0180371 A1 | 8/2006 | Breed et al. |
| 2006/0199530 A1* | 9/2006 | Kawasaki ............ 455/7 |
| 2006/0199537 A1 | 9/2006 | Eisenbach |
| 2006/0212239 A1 | 9/2006 | Letts et al. |
| 2006/0212540 A1 | 9/2006 | Chon et al. |
| 2006/0226298 A1 | 10/2006 | Pierson |
| 2007/0010922 A1 | 1/2007 | Buckley |
| 2007/0043488 A1 | 2/2007 | Avery et al. |
| 2007/0072154 A1 | 3/2007 | Akatsuka et al. |
| 2007/0073459 A1 | 3/2007 | Webster et al. |
| 2007/0073460 A1 | 3/2007 | Bertosa et al. |
| 2007/0083307 A1 | 4/2007 | Pasztor et al. |
| 2007/0100520 A1 | 5/2007 | Shah et al. |
| 2007/0146133 A1 | 6/2007 | Wehrenberg |
| 2007/0156311 A1 | 7/2007 | Elcock et al. |
| 2007/0200550 A1 | 8/2007 | Corredoura |
| 2007/0244611 A1 | 10/2007 | Brozovich |
| 2007/0244614 A1 | 10/2007 | Nathanson |
| 2007/0288134 A1 | 12/2007 | Rollinger et al. |
| 2007/0290847 A1 | 12/2007 | Harrington et al. |
| 2007/0294556 A1 | 12/2007 | Wutka |
| 2008/0003997 A1 | 1/2008 | Parkkinen et al. |
| 2008/0004764 A1 | 1/2008 | Chinnadurai et al. |
| 2008/0015748 A1 | 1/2008 | Nagy |
| 2008/0033609 A1 | 2/2008 | Razavi |
| 2008/0070501 A1 | 3/2008 | Wyld |
| 2008/0076389 A1 | 3/2008 | Lee et al. |
| 2008/0082221 A1 | 4/2008 | Nagy |
| 2008/0082278 A1 | 4/2008 | Tan et al. |
| 2008/0103658 A1 | 5/2008 | Boac et al. |
| 2008/0122288 A1 | 5/2008 | Plante et al. |
| 2008/0125067 A1 | 5/2008 | Bells et al. |
| 2008/0140281 A1 | 6/2008 | Morris et al. |
| 2008/0228344 A1 | 9/2008 | Sampson et al. |
| 2008/0248748 A1 | 10/2008 | Sangster et al. |
| 2008/0271107 A1 | 10/2008 | Shioyama et al. |
| 2008/0319665 A1 | 12/2008 | Berkobin et al. |
| 2009/0046601 A1* | 2/2009 | Nordmark et al. ............ 370/255 |
| 2009/0125351 A1 | 5/2009 | Davis, Jr. |
| 2009/0150970 A1 | 6/2009 | Hinds et al. |
| 2009/0253410 A1 | 10/2009 | Fitzgerald et al. |
| 2009/0256690 A1 | 10/2009 | Golenski |
| 2009/0265057 A1 | 10/2009 | Chinnadurai et al. |
| 2009/0276115 A1 | 11/2009 | Chen |
| 2009/0288009 A1 | 11/2009 | Dulaney |
| 2009/0299539 A1 | 12/2009 | Chinnadurai et al. |
| 2009/0307188 A1 | 12/2009 | Oldham et al. |
| 2010/0042288 A1 | 2/2010 | Lipscomb et al. |
| 2010/0076644 A1 | 3/2010 | Cahill et al. |
| 2010/0100646 A1 | 4/2010 | Park |
| 2010/0128632 A1 | 5/2010 | Mantysalo |
| 2010/0179717 A1 | 7/2010 | Gilbert |
| 2010/0205450 A1 | 8/2010 | Sarnacke et al. |
| 2010/0289872 A1 | 11/2010 | Funabiki et al. |
| 2011/0141953 A1 | 6/2011 | Wright et al. |
| 2011/0153798 A1 | 6/2011 | Groenendaal et al. |
| 2011/0313593 A1 | 12/2011 | Cohen et al. |
| 2012/0044052 A1 | 2/2012 | Davis et al. |
| 2012/0044086 A1 | 2/2012 | Ruther et al. |
| 2012/0044527 A1 | 2/2012 | Panko |
| 2012/0044607 A1 | 2/2012 | Loewe |
| 2012/0045927 A1 | 2/2012 | Panko et al. |
| 2012/0046807 A1 | 2/2012 | Ruther et al. |
| 2012/0046825 A1 | 2/2012 | Ruther et al. |
| 2012/0046826 A1 | 2/2012 | Panko |
| 2012/0046897 A1 | 2/2012 | Panko |
| 2012/0047289 A1 | 2/2012 | Krzystofczyk et al. |
| 2012/0047291 A1 | 2/2012 | Davis et al. |
| 2012/0047458 A1 | 2/2012 | Alberry et al. |
| 2012/0047499 A1 | 2/2012 | Krzystofczyk et al. |
| 2012/0139952 A1 | 6/2012 | Imai et al. |
| 2012/0215398 A1 | 8/2012 | Chen et al. |
| 2012/0242510 A1 | 9/2012 | Choi et al. |
| 2013/0295912 A1 | 11/2013 | Chen |
| 2013/0297143 A1 | 11/2013 | Chen et al. |

FOREIGN PATENT DOCUMENTS

| | | |
|---|---|---|
| DE | 20 2009 009 035 U1 | 10/2009 |
| EP | 1191498 A1 | 3/2002 |
| GB | 2277807 A | 11/1994 |
| GB | 2385934 A | 9/2003 |
| GB | 2405486 A | 3/2005 |
| JP | 2008233970 A | 10/2008 |
| WO | 9956201 A1 | 11/1999 |
| WO | 00/34838 A1 | 6/2000 |
| WO | 01/59601 A1 | 8/2001 |
| WO | 0155690 A1 | 8/2001 |
| WO | 0167420 A1 | 9/2001 |
| WO | 0186576 A1 | 11/2001 |
| WO | 2005121814 A1 | 12/2005 |
| WO | 2006008527 A2 | 1/2006 |
| WO | 2006/050454 A2 | 5/2006 |
| WO | 2006055289 A2 | 5/2006 |
| WO | 2006110786 A2 | 10/2006 |
| WO | 2007022426 A2 | 2/2007 |
| WO | 2007038983 A1 | 4/2007 |
| WO | 2007058607 A1 | 5/2007 |
| WO | 2008/043043 A2 | 4/2008 |
| WO | 2008063818 A2 | 5/2008 |
| WO | 2009/137584 A1 | 11/2009 |
| WO | 2009149007 A1 | 12/2009 |
| WO | 2010019771 A1 | 2/2010 |

OTHER PUBLICATIONS

Engineer Live, "Ethernet Makes it Way Into the Car," Article date: Jun. 9, 2009, downloaded from the World Wide Web at http://www.engineerlive.com/Design-Engineer/Automotive_Design/Ethernet_makes_its_way_into_the_car/21822/ on Jul. 25, 2011, 4 pages.

OBD-II PIDs, downloaded from the World Wide Web at http://web.archive.org/web/20100329141311/http://en.wikipedia.org/wiki/OBD-II_PIDs, as available on Mar. 29, 2010, 13 pages.

Sorion Electronic Limited, J1962—OBD Diagnostics Connectors, downloaded from World Wide Web at http://www.sorion-group.com/SEL0051_connector.htm on May 24, 2010, pp. 1-3.

Memopad, The OBD2 Cable for Allpro adapter, downloaded from the World Wide Web at http://datawave.commm.com/entry/USB-OBD2-AllPro-adapter, pp. 1-16, Oct. 8, 2008.

Tyco Electronics, Fundamentals of PolySwitch Overcurrent and Overtemperature Devices, pp. 1-13, Sep. 2, 2009.

International Organization for Standardization, ISO TC 22/SC 3, ISO 15031-1:2001(E), Road vehicles—Communication between vehicle and external test equipment for emissions-related diagnostics—Part 1: General information, 36 pages, Aug. 5, 2001.

International Organization for Standardization, ISO TC 22/SC 3 N, ISO/CD 22900-2, Road vehicles, Modular VCI (Vehicle Communication Interface)—Part 2: D-PDU API (Diagnostic Protocol Data Unit Application Programmer Interface), 144 pages, Mar. 31, 2005.

International Organization for Standardization, ISO TC 22/SC 3 N, ISO/CD 22900-1, Road vehicles—Modular Vehicle Communication Interface (MVCI)—Part 1: Hardware design requirements, 29 pages, Mar. 31, 2005.

International Organization for Standardization, ISO TC 22/SC 3 N, ISO/CD 22900-1, Road vehicles—Modular Vehicle Communication Interface (MVCI)—Part 3: D-Server API (Diagnostic Server Application Programmer Interface), 159 pages, Mar. 31, 2005.

International Organization for Standardization, ISO 15031-3:2400(E), Road vehicles—Communication between vehicle and external equipment for emissions-related diagnostics—Part 3: Diag-

(56) References Cited

OTHER PUBLICATIONS nostic connector and related electrical circuits, specification and use—Annex B pp. 17-18, Jul. 2004.
Vital Engineering, Support and Frequently Asked Question regarding the Car-Pal OBD Interface Unit, Jan. 4, 2007, downloaded from the World Wide Web at http://www.vitalengineering.co.uk/support.htm, 8 pages.
Tech Shop Magazine; Snap-on Introduces Verdict Diagnostic and Information System; Aug. 26, 2010; downloaded from the World Wide Web at http://www.techshopmag.com/Controls/PrinterFriendly/PrinterFriendly.aspx, 3 pages.
Snap-On Incorporated, MODIS, Scanner Plug-in User Manual, ZEEMS303L, Rev. A, Aug. 2009, 61 pages.
Snap-On Incorporated, MODIS, Display User Manual, ZEEMS300N, Rev. A, Aug. 2009, 72 pages.
Snap-On Incorporated, MODIS, Component Tests User Manual, ZEEMS308G, Rev. C, Feb. 2009, 52 pages.
Snap-On Incorporated, MODIS, Flexible Gas Analyzer User Manual, ZEEMS306B, Rev. A, Aug. 2009, 47 pages.
Snap-On Incorporated, MODIS, Lab Scope Plug-in User Manual, ZEEMS305K, Rev. C, Feb. 2009, 73 pages.
Metzelaar, R.H.M., Automotive Oscilloscope Applications, Peugeot 205 Holding Back, downloaded from the World Wide Web at http://www.tiepie.com/uk/automotive/GMT/peugot_205_holding_back.html on Jul. 12, 2010, pp. 1-4.
Zussman, Gil et al, Bluetooth Time Division Duplex Analysis as a Polling System, Aug. 19, 2004, 10 pages.
Fluke Corporation, Digital Multimeters, downloaded from the World Wide Web at http://us.fluke.com/usen/products/categorydmm on Jan. 28, 2010, 2 pages.
Fluke Corportation, 233 True=rms Remote Display Digital Multimeter Users Manual, Sep. 2009, 27 pages.
Bluetooth Sig, Inc., Bluetooth Architecture—Data Transport, downloaded from the World Wide Web at http://www.bluetooth.com/KnowledgeCenter/TechnologyOverview/Pages/DateTransport.aspx on May 6, 2010, 8 pages.
Shigeru et al, DL7100 Signal Explorer, A High-Speed Digital Oscilloscope with Long Record Length, Yokogawa Electric Corporation, Yogogawa Technical Report English Edition, No. 30, (2000), 4 pages.
BLUETOMORROW.COM, Bluetooth Pairing, downloaded from the World Wide Web at www.bluetomorrow.com on Apr. 30, 2010, 3 pages.
Snap-On Diagnostics, Snap-on Introduces VERDICT Diagnostic and Information System, Aug. 24, 2010, 2 pages.
Testpath, Inc., Fluke Meter Holsters, downloaded from the World Wide Web at http://www.testpath.com/Categories/Fluke-Meter-Holsters-2220.htm on May 6, 2010, 2 pages.
BMW Canada, Bluetooth Pairing Instructions, Sep. 2009, 10 pages.
Accessory Geeks, Bluetooth Pairing Guides, downloaded from the World Wide Web at http://www.accessorygeeks.com/bluetooth-pairing-guide1.html on Apr. 30, 2010, 2 pages.
Quatech, Inc., Bluetooth Communication Overview, downloaded from the World Wide Web at http://lwww.quatech.com/support/comm-over-bluetooth.php on May 3, 2010, 3 pages.
Omitec Limited, T4 Diagnostic System, downloaded from the World Wide Web at http://web.archive.org/web/20091119041838/http://www.omitec.com/us/products/diagnostic-testers/t4-diagnostic-system/ as archived on Nov. 19, 2009, 2 pages.
Omitec Limited, Workstations, downloaded from the World Wide Web at http://web.archive.org/web/20100322213801/http://www.omitec.com/us/products/workstation/ as archived on Mar. 22, 2010, 3 pages.
ANOTHERURL.COM, Bluetooth, What is Bluetooth? downloaded from the World Wide Web at http://www.anotherurl.com/library/bluetooth_research.htm on May 17, 2010, 15 pages.
Snap-On Incorporated, EEDM604C, Multimeter, Digital, Automotive, True RMS, Auto Ranging, Hybrid Vehicles, downloaded from the World Wide Web at http://buy1.snapon.com/catalog/item.asp?store=snapon-store&item_ID=88136&group_ID=1367 on May 4, 2010, 2 pages.
Snap-On Incorporated, EEDM596DK, Multimeter, Digital, Advanced, Manual Ranging, downloaded from the World Wide Web at http://buy1.snapon.com/catalog/item.asp?store=snapon-store&item_ID=84657&group_ID=1367 on May 4, 2010, 2 pages.
Snap-On Incorporated, EEDM503D, Multimeter, Digital, Automotive, True RMS, downloaded from the World Wide Web at http://buy1.snapon.com/catalog/item.asp?store=snapon-store&item_ID=84656&group_ID=1367 on May 4, 2010, 1 page.
Fluke, 163/164 MultiFunction Counter Users Manual, Feb. 1, 1997, 102 pages.
Fluke, Fluke 164 2.7 GHz Multifunction Counter Technical Data, May 10, 2007, 11 pages.
Report Lab, OBD-II PIDS, Jul. 6, 2010, 13 pages.
Flores, J., Wireless Diagnostics and Consultancy Services, Vital Engineering, Jan. 4, 2007, 8 pages.
Fluke, Fluke 199B/003 Scopemeter 200 MHz, Dual Portable Multimeter and Oscilloscope, downloaded from the World Wide Web at http://web.archive.org/web/20100413065253/http://www.fluke199.com/ as archived on Apr. 12, 2010, 7 pages.
Fluke Corporation, ScopeMeter 120 and 190 Series incl. 225C and 215C, Technical Data, Jan. 2010, 10 pages.
Fluke Corporation, Fluke 19xC-2x5C Scopemeter, Software version 8.00 onwards, Users Manual, Jul. 2008, 159 pages.
U.S. Appl. No. 12/859,051 filed on Aug. 18, 2010, 51 pages.
Jones, Mike, Senior FAE, Micrel Inc., Ethernet Driving Down Automotive Cost of Ownership; Oct. 31, 2008, 31 pages.
Nology Engineering, Inc., Nology, PDA-Dyno and OBD II Scan Tool Operating Manual, 2009, 37 pages.
OBD-2.COM, OBDII Automotive Scan Tool and Virtual Dashboard, downloaded from the World Wide Web at http://www.obd-2.com/ on Jul. 11, 2010, 15 pages.
U.S. Appl. No. 12/859,077 filed on Aug. 18, 2010, 47 pages.
U.S. Appl. No. 12/858,699 filed on Aug. 18, 2010, 62 pages.
U.S. Appl. No. 12/859,082 filed on Aug. 18, 2010, 36 pages.
U.S. Appl. No. 13/189,940 filed on Jul. 25, 2011, 60 pages.
U.S. Appl. No. 13/205,318 filed on Aug. 8, 2011, 31 pages.
U.S. Appl. No. 13/198,974 filed on Aug. 5, 2011 71 pages.
U.S. Appl. No. 12/913,249 filed on Oct. 27, 2010, 91 pages.
U.S. Appl. No. 12/913,184 filed on Oct. 27, 2010, 90 pages.
U.S. Appl. No. 12/859,011 filed on Aug. 18, 2010, 86 pages.
U.S. Appl. No. 13/198,426 filed on Aug. 4, 2011, 55 pages.
U.S. Appl. No. 12/858,725 filed on Aug. 18, 2010, 46 pages.
U.S. Appl. No. 13/198,530 filed on Aug. 4, 2011, 57 pages.

\* cited by examiner

SYSTEM AND METHOD FOR EXTENDING COMMUNICATION RANGE AND REDUCING POWER CONSUMPTION OF VEHICLE DIAGNOSTIC EQUIPMENT

REFERENCE TO RELATED APPLICATION(S)

This application is a continuation of prior U.S. patent application Ser. No. 12/859,040, filed Aug. 18, 2010. U.S. patent application Ser. No. 12/859,040 is incorporated herein by reference.

BACKGROUND

Vehicles, such as automobiles, light-duty trucks, and heavy-duty trucks, play an important role in the lives of many people. To keep vehicles operational, some of those people rely on vehicle technicians to diagnose and repair their vehicle.

Vehicle repair technicians use a variety of tools in order to diagnose and/or repair vehicles. Those tools may include common hand tools, such as wrenches, hammers, pliers, screwdrivers and socket sets, or more vehicle-specific tools, such as cylinder hones, piston ring compressors, and vehicle brake tools.

Modern vehicles have evolved into very complex machines with thousands of various parts that perform a vast array of operations that permit the vehicle to be operated by the user. Additionally, more and more vehicle operations that previously were controlled by mechanical interactions are instead being controlled by electronic control circuits and logic. As with any such complex machine, malfunctions may occur in one or more parts of the vehicle from time to time, including the electronic control circuits.

As a result, repair technicians must now rely on sophisticated electronic equipment to diagnose and repair vehicular malfunctions. Electronic tools such as data acquisition devices (DAQs) and vehicle scanner devices have been developed to interface with a vehicle and diagnose the sophisticated electronic equipment. DAQs incorporate various measurement functions such as voltage and current measurement probes to aid a repair technician in diagnosing a vehicle under test.

Vehicle scanner devices may be used to access electronic equipment within the vehicle under test. Modern vehicles include an on-board diagnostic port (OBD port) or a diagnostic link connector (DLC). An OBD port or DLC generally comprises a plug-in type connector that is coupled to an on-board computer within the vehicle. The on-board computer is then coupled to various sensors at various places within the vehicle. The sensors can report current operating characteristics of vehicle elements and/or sense the existence of a malfunction in the various vehicle elements. By plugging in an appropriate scanner device into the OBD or DLC, status or error codes can be retrieved from the OBD or DLC. These error codes may provide information as to the source of a malfunction in the electronic control circuits in the vehicle.

In order to further process data received from the DLC or OBD port, the vehicle scanner device may transmit the vehicle diagnostic data to another, more robust processing device, such as a display device. The display device may further contain a substantial database of information about the particular vehicle under test from which the data is retrieved, and may correlate the error codes retrieved to particular malfunctions and perhaps display further diagnostic steps that may be taken to diagnose the problem. Further diagnostic steps may include the retrieval of additional diagnostic information from the OBD or DLC port via the vehicle scanner device, or the measurement of vehicle attributes using the DAQ.

By providing the repair technician with detailed information for quickly diagnosing and repairing vehicles, vehicle repair times can be decreased, vehicle turn-over is increased, and as a result, repair technicians may reap increased profits from a same amount of garage space.

OVERVIEW

Disclosed herein are methods and systems that provide for vehicle scanner and DAQ devices that may communicate wirelessly with a more powerful separate display device. By providing for a modular separation of scanner, DAQ, and display devices, and including wireless data connections between them, costs of the individual devices can be reduced while improving ease of use and eliminating garage clutter. In order to compensate for potential interference and loss of wireless connectivity with the display device, and/or to reduce power consumption, embodiments are disclosed that allow commands and/or vehicle data to be relayed from one of the vehicle scanner, DAQ, and/or display device to another of the vehicle scanner, DAQ, and/or display device.

In accordance with a first embodiment of a diagnostic device, a method of obtaining and transmitting vehicle diagnostic data includes the diagnostic device obtaining vehicle diagnostic data via a vehicle interface with a diagnostic port of a vehicle. Once the data is obtained, the diagnostic device determines whether a direct wireless connection with a display device is available. Additionally or alternatively, the diagnostic device determines whether an indirect wireless connection with the display device is available via a second separate vehicle diagnostic device. The diagnostic device may then make a further determination and, responsive to the further determination, indirectly transmit the obtained diagnostic data to the display device via the second separate vehicle diagnostic device.

The further determination may be a determination based on an availability of wireless connections. For example, the further determination may be a determination that a prior-established direct wireless connection with the display device has been interrupted. Alternatively, the further determination may be a determination that the direct wireless connection with the display device is not available and that an indirect wireless connection with the display device via the second separate vehicle diagnostic device is available.

In another embodiment, the further determination may be a determination based on a consideration of power source type and/or power level. For example, the further determination may be a determination that the second separate vehicle diagnostic device is operating off of an external power source, and therefore has a more robust power source. As a result, the diagnostic device may conclude that it can save its own power source (which may be battery-based) by transmitting at a lower power to the second vehicle diagnostic device, and rely upon the second diagnostic device and its more robust power source (which may be, for example, provided by a vehicle under test, a wall socket, or some other source) to relay the diagnostic data to the display device. In the event that both the first and second vehicle diagnostic devices are running on battery power, the further determination may be, for example, a determination that an amount of battery power remaining at the first vehicle diagnostic device is less than an amount of battery power remaining at the second vehicle diagnostic device.

In a further embodiment, determining whether an indirect wireless connection to the display device is available may include the vehicle diagnostic device transmitting a packet to a broadcast address, and responsive to the transmission, wirelessly receiving a packet from the second vehicle diagnostic device indicating an ability to act as a wireless relay agent to the display device.

In one embodiment, the first vehicle diagnostic device is one of a vehicle scanner and a DAQ, and the second separate vehicle diagnostic device is the other of the vehicle scanner and the DAQ. For example, the first vehicle diagnostic device may be a DAQ operating on battery power, and the second vehicle diagnostic device may be a vehicle scanner operating off of an external power source. The external power source may be, for example, a battery provided in a vehicle under test. The diagnostic data may be, for example, diagnostic trouble codes obtained by the vehicle scanner and transmitted to the DAQ for relay to the display device.

In a further embodiment, a method of transmitting diagnostic communications may include a first vehicle diagnostic device receiving a diagnostic communication, consisting of one or more communications selected from the group consisting of vehicle diagnostic information and vehicle diagnostic commands, from one of a second vehicle diagnostic device and a display device via a wireless communications interface using a first wireless protocol. The first wireless protocol may be one of an IEEE 802.11 protocol and a Bluetooth protocol, among other protocols.

Responsive to receiving the diagnostic communication, the first vehicle diagnostic device forwards the diagnostic communication to the other of the second vehicle diagnostic device and the display device via the wireless communications interface using a second wireless protocol. The second wireless protocol may be different from the first wireless protocol. First example, the first wireless protocol may be IEEE 802.11, and the second may be Bluetooth.

Furthermore, the first vehicle diagnostic device may periodically transmit a packet to a broadcast address via its wireless communications interface indicating an ability to act as a relay agent to the display device. Additionally or alternatively, the first vehicle diagnostic device, responsive to receiving a broadcast packet from the second vehicle diagnostic device, may transmit a unicast packet to the second vehicle diagnostic device indicating an ability to act as a relay agent to the display device.

The diagnostic communication may, for example, be a command instructing one of the display device and the second vehicle diagnostic device to execute a function in diagnosing a vehicle malfunction. Alternatively or additionally, the diagnostic communication may be vehicle diagnostic data for use by the one of the display device and the second vehicle diagnostic device in diagnosing a vehicle malfunction. The vehicle diagnostic data may comprise vehicle troubleshooting data retrieved from a vehicle under test, or may comprise image information illustrating how to operate the one of the display device and the second vehicle diagnostic device. Other possibilities exist as well.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments of the invention are described herein with reference to the drawings, in which.

DETAILED DESCRIPTION

I. Example Architecture

Figure 1:
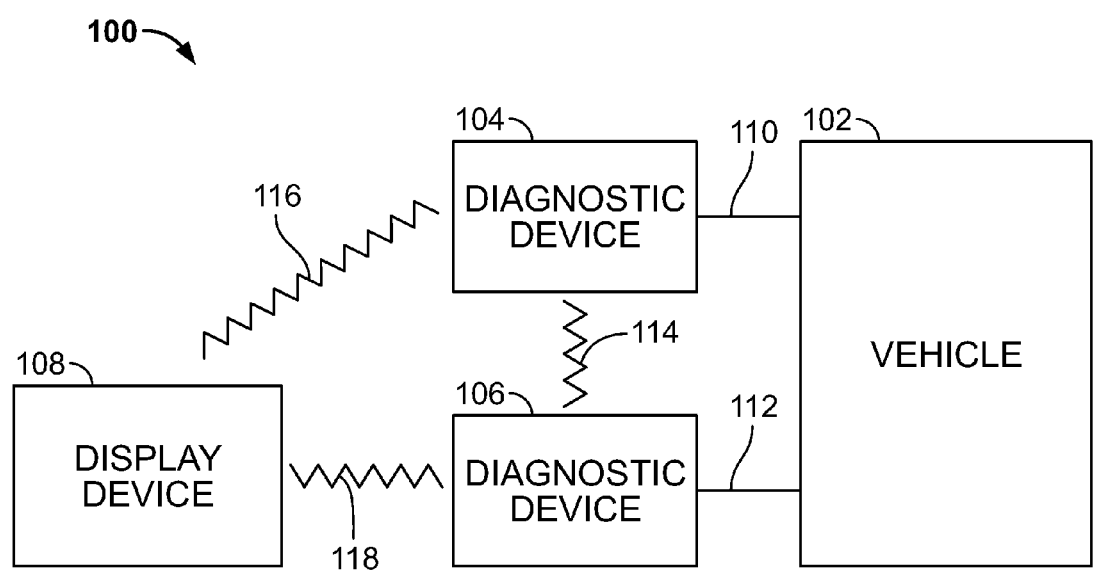
FIG. 1 is a block diagram of a system in which a display device and diagnostic devices in accordance with an example embodiment may operate.

FIG. 1 is a block diagram of a system 100 in accordance with an example embodiment. System 100 comprises a vehicle 102 under test, a first diagnostic device 104, a second diagnostic device 106, and a controller/display device 108 (display device).

The block diagram of FIG. 1 and other block diagrams and flow charts accompanying this description are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (for example, machines, interfaces, functions, orders, and groupings of functions, etc.) can be used instead. Furthermore, various functions described as being performed by one or more elements can be carried out by a processor executing computer-readable program instructions from a computer readable medium and/or by any combination of hardware, firmware, and software.

First and second diagnostic devices 104, 106 may be any device capable of obtaining data from vehicle 102 under test useful in diagnosing a problem with the vehicle 102. For example, diagnostic devices 104, 106 may be any one of a data acquisition device (DAQ), a vehicle scanner, an engine analyzer, a gas/exhaust analyzer, a cooling system pressure tester, a thermometer, a battery analyzer, and a cylinder compression tester. Other diagnostic device could also be used. In a preferred embodiment, first diagnostic device 104 is a data acquisition device (DAQ) and second diagnostic device 106 is a vehicle scanner.

DAQ 104 and vehicle scanner 106 may connect to vehicle 102 under test via wired links 110 and 112, respectively. The vehicle 102 may comprise an automobile, a motorcycle, a semi-tractor, farm machinery, or some other motorized vehicle. System 100 is operable to carry out a variety of functions, including functions for servicing the vehicle 102. The example embodiments may be used with any desired system or engine. Those systems or engines may comprise items utilizing fossil fuels, such as gasoline, natural gas, propane, and the like, electricity, such as that generated by battery, magneto, fuel cell, solar cell and the like, wind and/or hybrids or combinations thereof. Those systems or engines may be incorporated into other systems, such as an automobile, a truck, a boat or ship, a motorcycle, a generator, an airplane and the like. DAQ 104 and vehicle scanner 106 may include batteries that provide operational power, or may receive operating power through their respective wired links 110 and 112 with the vehicle 102 or through some other external link. Furthermore, the embodiments described herein may include or be utilized with any appropriate voltage or current source, such as a battery, an alternator, a fuel cell, and the like, providing any appropriate current and/or voltage, such as about 12 Volts, about 42 Volts, and the like.

Each of the DAQ 104, vehicle scanner 106, and display device 108 may create and/or maintain a wireless link with any of the other devices via respective wireless links 114, 116, and 118. The wireless links 114, 116, and 118 may operate via a same wireless protocol, or via different wireless protocols, the only limitation being that each pair of wirelessly communicating devices in FIG. 1 must both support a same particular wireless protocol to communicate.

Each of the one or more wireless links 114, 116, and 118 may be arranged to carry out communications according to an industry standard, such as an Institute of Electrical and Electronics Engineers (IEEE) 802 standard. The IEEE 802 standard may comprise an IEEE 802.11 standard for Wireless Local Area Networks (e.g., IEEE 802.11a, b, g, or n), an IEEE 802.15 standard for Wireless Personal Area Networks, an IEEE 802.15.1 standard for Wireless Personal Area Networks—Task Group 1, an IEEE 802.16 standard for Broadband Wireless Metropolitan Area Networks, or some other IEEE 802 standard. For purposes of this description, a wireless network arranged according to the IEEE 802.11 standard can be referred to as a Wi-Fi network, and a wireless network arranged according to the IEEE 802.15.1 can be referred to as a Bluetooth (BT) network. Other protocols could also or alternatively be used.

Each of the devices 104, 106, and 108 may transmit data and/or commands to one another via the wireless links 114, 116, and 118. As an example, display device 108 may establish a wireless link 116 with DAQ 104 and send an instruction to the DAQ 104 to switch to "voltmeter mode." DAQ 104 may then respond by taking a voltage reading from the vehicle 102 and transmitting the voltage reading to display device 108 via the wireless link 116. Each of the devices 104, 106, and 108 may also function to relay data from one device to the other. For example, if the wireless link 118 in FIG. 1 is currently unavailable, or for some other reason, vehicle scanner 106 may transmit diagnostic data to display device 108 via DAQ 104 and wireless links 114 and 116. Each of wireless links 114 and 116 may operate according to a same wireless protocol (e.g., Bluetooth) or according to different protocols (e.g., Bluetooth and IEEE 802.11, among others). A single transceiver in DAQ 104 may operate in accordance with both protocols, perhaps in a time-shared manner, or two transceivers in DAQ 104 may operate in accordance with each different protocol. In addition to diagnostic data, commands may be transmitted back and forth across wireless links 114 and 116. For example, display device 108 may transmit commands and/or data to DAQ 104 for relaying to vehicle scanner 106 via wireless links 114 and 116. A command transferred to vehicle scanner 106 via DAQ 104 may include, for example, a command to retrieve certain error codes from the vehicle 102.

Each of the devices 104, 106, and 108 will now be described in more detail. As set forth above, although in a preferred embodiment devices 104, 106, and 108 comprise a DAQ, vehicle scanner, and display device, respectively, other embodiments may comprise different devices performing different functions.

Figure 2:
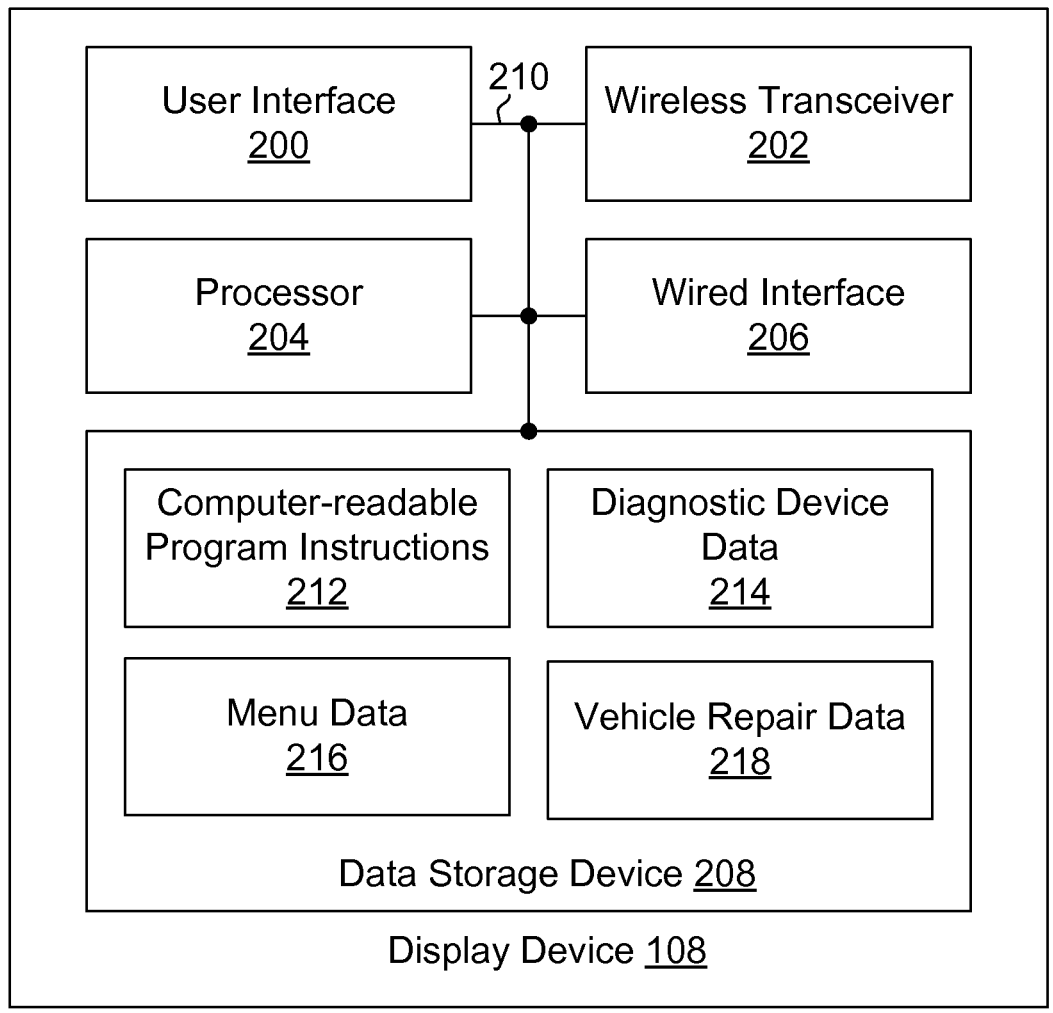
FIG. 2 is a block diagram of an example controller/display device.

FIG. 2 is a block diagram of display device 108, which includes a user interface 200, a wireless transceiver 202, a processor 204, a wired interface element 206, and a data storage device 208, all of which may be linked together via a system bus, network, or other connection mechanism 210.

User interface 200 is operable to present data to a user and to enter user selections. User interface 200 may include a display 300 (illustrated in FIG. 3) that is operable to visually present input data transmitted to wireless transceiver 206 from vehicle scanner 106 or DAQ 104. Display 300 may also simultaneously display input data received from multiple diagnostic devices, such as input data received from both DAQ 104 and vehicle scanner 106. Display 300 may also display data stored at data storage device 208, such as menu data 216 or vehicle repair data 218. User interface 200 may further include an input selection element that is operable to enter a user selection. Further examples of input selection elements are further illustrated in FIG. 3.

Wireless transceiver 202 comprises a wireless receiver and transmitter operable to carry out wireless communications with one or more of DAQ 104, vehicle scanner 106, and/or some other diagnostic device that is operating within wireless communication range of display device 108. As an example, wireless transceiver 202 may comprise a transceiver that is operable to carry out communications via a BT network. For purposes of this description, a transceiver that is operable to carry out communications via a BT network can be referred to as a BT transceiver. As another example, wireless transceiver 202 may comprise a transceiver that is operable to carry out communications via a Wi-Fi network. For purposes of this description, a transceiver that is operable to carry out communications via a Wi-Fi network can be referred to as a Wi-Fi transceiver. Other wireless communications protocols could also or alternatively be used, including, for example, WiMAX, Cellular, ZigBee, and Wireless USB, among others.

In accordance with an embodiment in which devices 104, 106, and 108 each include a single wireless transceiver (e.g., a BT transceiver), one of the devices, such as display device 108, may operate as a master device, and the other devices, such as DAQ 104 and vehicle scanner 106, may operate as slaves to the master. Other arrangements are possible as well. Vehicle scanner 106 and display device 108 may transmit communications via a wireless link 118 using, for example, a time-division duplex arrangement and synchronized to a clock signal of the master.

Wireless transceiver 202 is not limited to a single wireless transceiver. For example, wireless transceiver 202 may comprise a BT transceiver and a Wi-Fi transceiver. In accordance with such an example, the BT transceiver may communicate with DAQ 104 and/or vehicle scanner 106 via a BT network, and the Wi-Fi transceiver may communicate with DAQ 104 and/or vehicle scanner 106 via a Wi-Fi network.

In accordance with an embodiment in which display device 108 includes two transceivers (e.g., a BT transceiver and a Wi-Fi transceiver) and DAQ 104 and/or vehicle scanner 106 each include two transceivers (e.g., a BT transceiver and a Wi-Fi transceiver), DAQ 104 and/or vehicle scanner 106 may simultaneously transmit data to display device 108 for display via either one or both of the BT and Wi-Fi networks.

Each wireless transceiver of the example embodiments may operate in a transceiver-on-state. In the transceiver-on-state, the transceiver is powered on. While operating in the transceiver-on-state, the transceiver can transmit and receive data via an air interface. For some transceivers, while operating in the transceiver-on-state, the transceiver can transmit and receive data via the air interface simultaneously. For other transceivers, while operating in the transceiver-on-state, the transceiver can either transmit or receive data via the air interface at any given time. Each wireless transceiver of the example embodiments may also operate in a transceiver-off-state or low-power-state. While operating in the transceiver-off-state or low-power-state, the transceiver is powered off or in a low-power state and the transceiver refrains from transmitting and/or receiving data.

Each wireless transceiver of the example embodiments may also operate to relay communications from one device to another. In the case of having a single transceiver, data received from one device may be buffered internally prior to transmitting the data to another different device. In the case of having two or more transceivers, data received from one device on a first transceiver may be routed to the second transceiver for transmission to the another different device concurrently with reception of additional data at the first transceiver.

Wired interface 206 may include one or more wire-line ports. Each port provides an interface to display device 108 and to one or more circuits. In one respect, the one or more circuits may comprise electrical circuits, such as the electrical circuits of a Universal Serial Bus (USB) cable or the electrical circuits of an Ethernet cable (e.g., a CAT 5 cable). In another respect, the one or more circuits may comprise optical fibers that are operable to carry optical signals. Other examples of the one or more circuits are also possible.

Processor 204 may comprise one or more general purpose processors (e.g., INTEL microprocessors) and/or one or more special purpose processors (e.g., digital signal processors). Processor 204 may be configured to execute computer-readable program instructions (CRPI) 212 that are contained in computer-readable data storage device 208 and which cause the processor 204 to perform the functionality described herein.

Data storage device 208 may comprise a computer-readable storage medium readable by processor 204. In the context of this document, a computer-readable medium is an electronic, magnetic, optical, or other physical device or means that can contain or store a computer program for use by, or in connection with, a computer related system or method. The methods can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. Data storage device 208 may contain various data including, but not limited to, CRPI 212, diagnostic device data 214, menu data 216, and/or vehicle repair data 218. For brevity in this description, computer-readable program instructions are sometimes referred to as program instructions.

Diagnostic device data 214 may include data associated with a device that is arranged to communicate with display device 108 via one or more wireless communication links. For example, diagnostic device data 214 may include data associated with one of the DAQ 104 and vehicle scanner 106, such as a radio identifier, MAC address, security key, and/or password information. The associated data may be received at display device 108, for storing as diagnostic device data 214, during a pairing process carried out between display device 108 and the DAQ 104 and/or vehicle scanner 106. For example, the pairing process between vehicle scanner 106 and display device 108 may include vehicle scanner 106 providing display device 108 with data associated with vehicle scanner 106 and display device 108 providing vehicle scanner 106 with data associated with display device 108. After carrying out the pairing process, display device 108 may use the stored diagnostic device data 214 in establishing the communication link 118 with vehicle scanner 106. Diagnostic device data 214 is not limited to data associated with one diagnostic device. In that regard, diagnostic device data 214 may also include data associated with DAQ 104 and other devices not illustrated in the figures.

Menu data 216 comprises data that can be visually presented via user interface 200. Menu data 216 may include, for example, icons and images that provide a user with a graphical representation of input and functionality options. User controls 306 (See FIG. 3) may then be used to traverse the menu data 216 displayed on the display 300.

CRPI 212 may comprise program instructions that are executable by processor 204 to perform functions represented by the program instructions, such as operating system program instructions that provide for direct control and management of hardware components such as processor 204, data storage device 208, and user interface 200. The operating system can manage execution of other program instructions within CRPI 212. As an example, the operating system may comprise the Windows XP Embedded (XPe) operating system available from Microsoft Corporation, Redmond, Wash., United States. Other examples of operating system are also possible.

CRPI 212 may further comprise program instructions (referred to herein as PI-212-A) that are executable by processor 204 so as to cause display device 108 to operate as a peripheral manager (PM) that manages functions carried out by peripheral devices, such as DAQ 104 and vehicle scanner 106.

CRPI 212 may further comprise program instruction (referred to herein as PI-212-B) that are executable by processor 204 to cause the wireless transceiver 202 to transmit instructions or commands (such as mode-selection commands) to one or more of DAQ 104 and vehicle scanner 106, or to one of DAQ 104 and vehicle scanner 106 for relaying to the other. In one respect, an instruction mode-selection command may be addressed to a specific diagnostic device, such as DAQ 104. In another respect, the instruction or mode-selection command may be broadcast to any device within a transmission range of the wireless transceiver 202. In either respect, the instruction or mode-selection command may or may not include data that identifies the display device 108 as the source of the instruction or mode-selection command.

Figure 3:
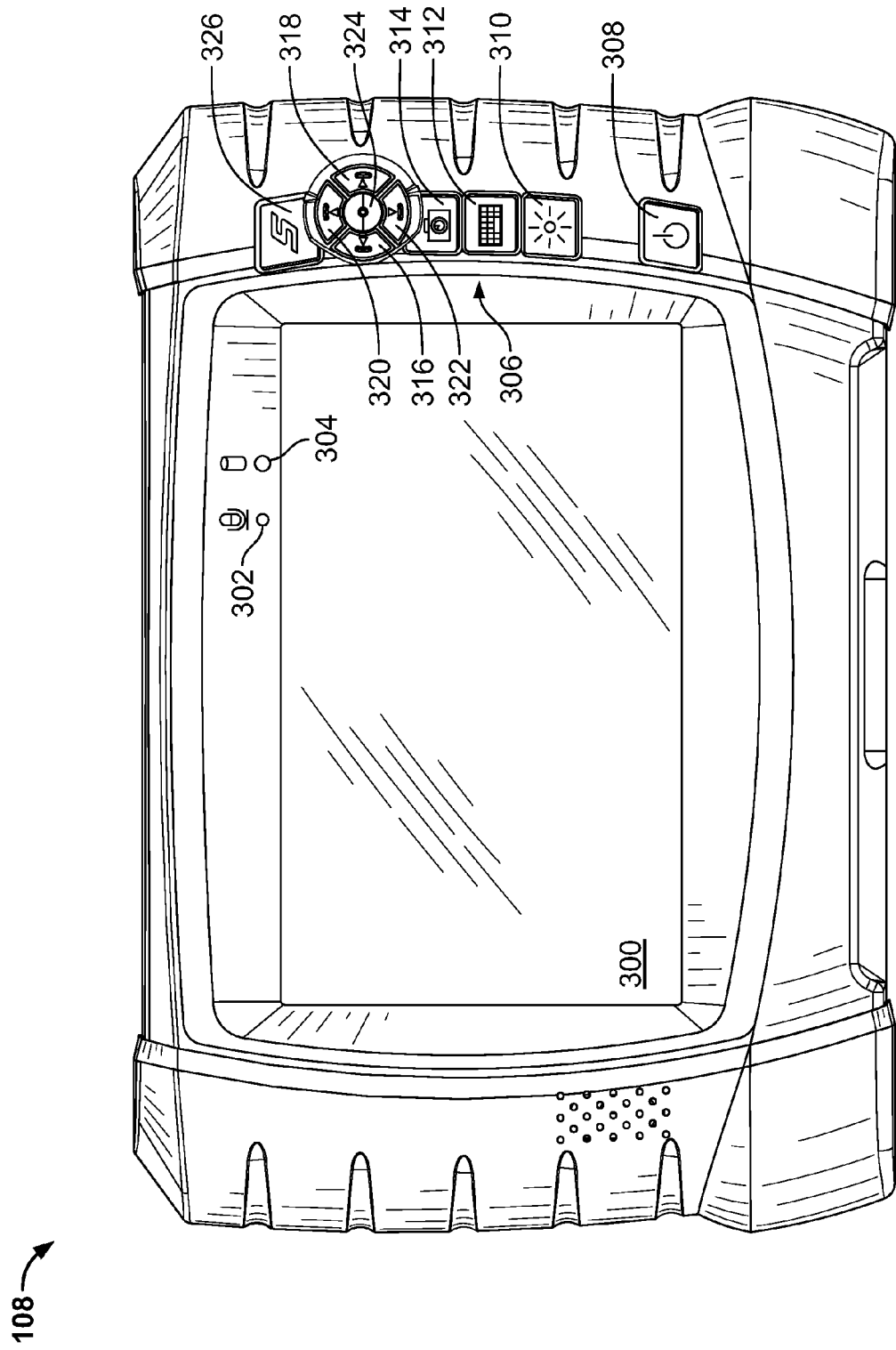
FIG. 3 illustrates a view of an example controller/display device.

Next, FIG. 3 illustrates a front view of an example embodiment of display device 108 with which vehicle scanner 106 may communicate. Display device 108 includes a display 300, a status indicator 304 (e.g., a light emitting diode (LED)), and user controls 306.

Display 300 may comprise a liquid crystal display (LCD), a plasma display, an electrophoretic display, or some other type of display. Display 300 is operable to visually present (e.g., display) data to a user, including, for example, vehicle diagnostic data transmitted to the display device 108 from a diagnostic device 104, 106. For purposes of this description, data displayed at display device 108 is referred to as "displayed data." The data received and presented on the display 300 may take the form of an alphanumeric presentation, a graphical presentation, or some other type of presentation.

User controls 306 are operable to enter a user selection. User controls 306 may be arranged in various ways. In that regard, user controls 306 may be arranged to include a keypad, rotary switches, push buttons, or some other means to enter a user selection. As set forth in the example embodiment illustrated in FIG. 3, user controls 306 may include, among others, a power button 308, a brightness button 310, a keyboard button 312, a cursor left button 316, a cursor right button 318, a cursor up button 320, a cursor down button 322, a menu item selection button 324, and a quick access button 326. Table 1 lists example user selections that can be entered using user controls 306. Other examples of user controls 306 and other examples of user selections are also possible.

TABLE 1

| User Button | Example User Selection |
| --- | --- |
| Power button 308 | Turn display device 108 power on and off. |
| Brightness button 310 | Increase or decrease a brightness of display 300. |
| Keyboard button 312 | Display keyboard at display 300. |
| Cursor left button 316 | Move a cursor, displayed at display 300, to the left. |
| Cursor right button 318 | Move a cursor, displayed at display 300, to the right. |
| Cursor up button 320 | Move a cursor, displayed at display 300, upwards. |
| Cursor down button 322 | Move a cursor, displayed at display 300, downwards. |
| Menu item selection button 324 | Select a menu item from a displayed menu data. |
| Quick access button 326 | Select a function that pertains to a current operating mode of display device 108. |

Figure 4:
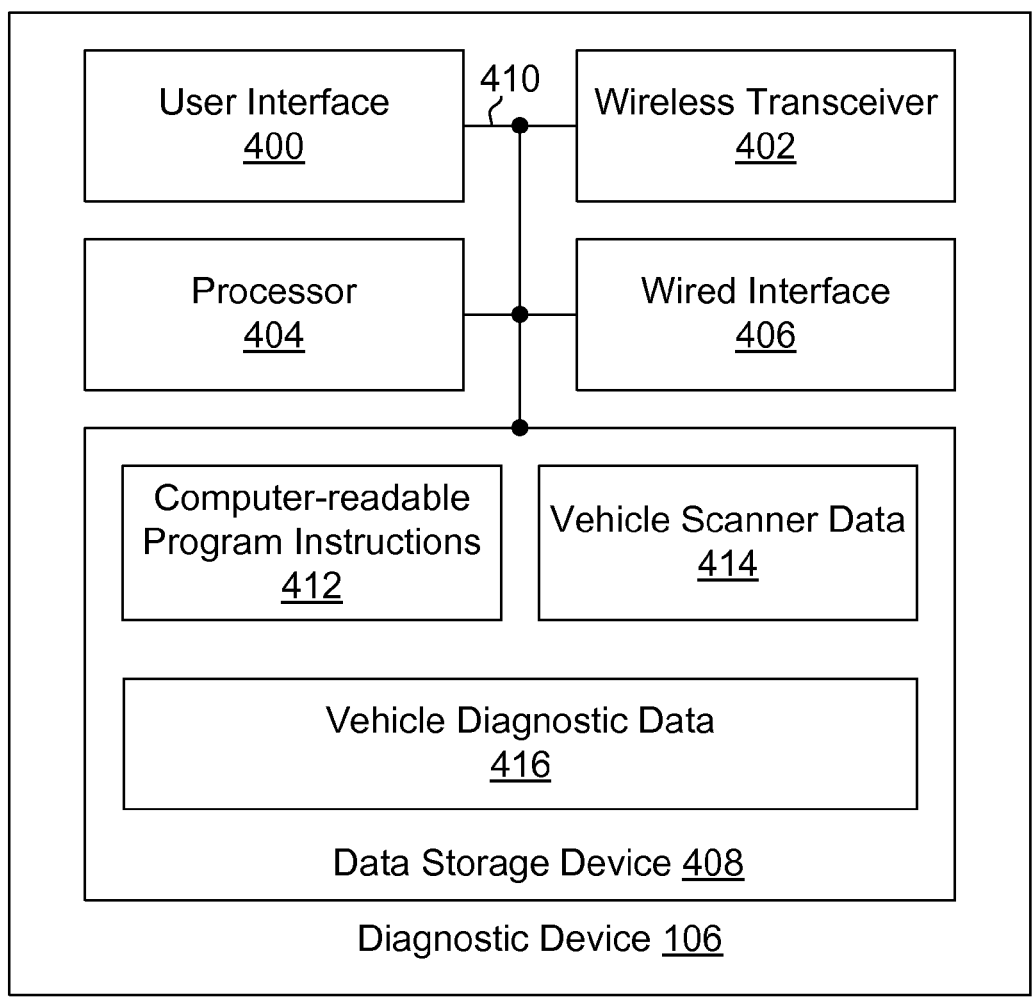
FIG. 4 is a block diagram of a first example diagnostic device (a vehicle scanner)
Figure 5:
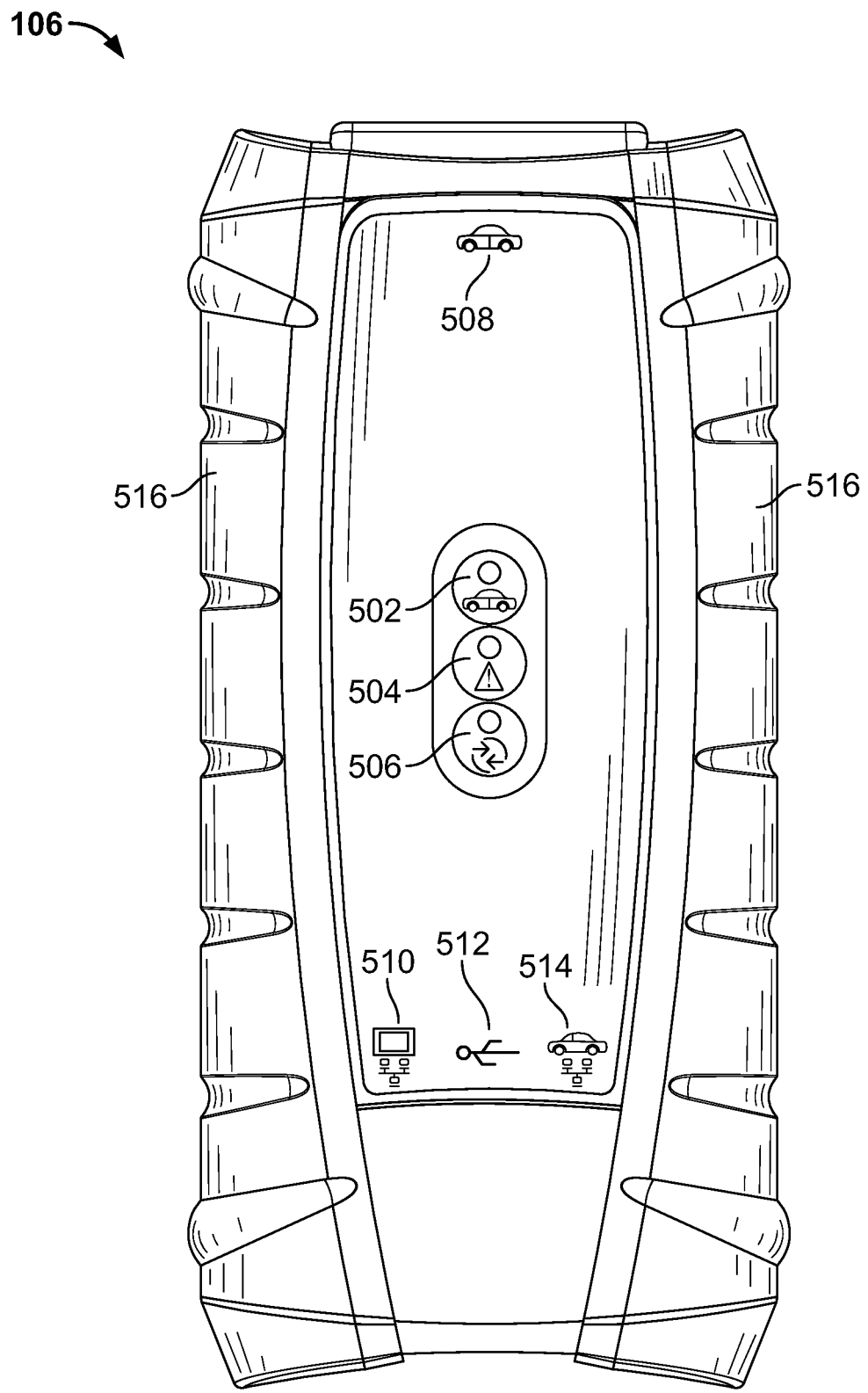
FIGS. 5-7 illustrate three views of the example vehicle scanner of FIG. 4.
Figure 6:
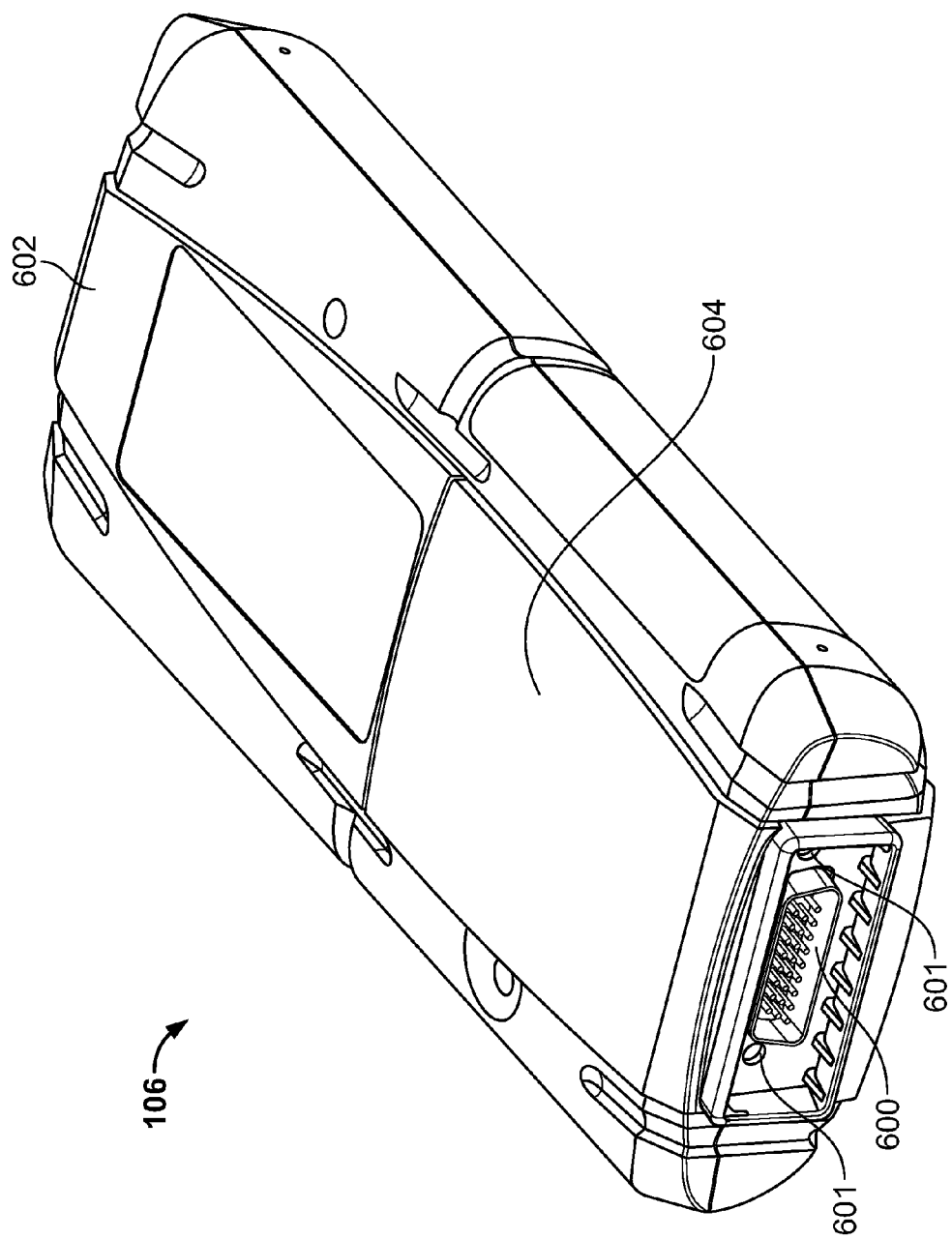

Next, FIG. 4 is a block diagram of a diagnostic device 106, and FIGS. 5 and 6 illustrate two different views of the diagnostic device 106. As illustrated in FIG. 4, diagnostic device 106 includes a user interface 400, a wireless transceiver 402, a processor 404, a wired interface 406, and a data storage device 408, all of which may be linked together via a system bus, network, or other connection mechanism 410. User interface 400 is operable to present information to a user of diagnostic device 106. Elements of user interface 400 are illustrated in FIG. 5. As set forth earlier, in a preferred embodiment, diagnostic device 106 may be a vehicle scanner device for retrieving status and error codes from vehicle 102 under test.

Wireless transceiver 402 comprises a wireless receiver and transmitter operable to carry out wireless communications with one or more of DAQ 104, display device 108, and/or some other device that is operating within wireless communication range of vehicle scanner 106. As an example, wireless transceiver 402 may comprise a transceiver that is operable to carry out communications via a BT network. As another example, wireless transceiver 402 may comprise a transceiver that is operable to carry out communications via a Wi-Fi network.

Wireless transceiver 402 is not limited to a single wireless transceiver. For example, wireless transceiver 402 may comprise both a BT transceiver and a Wi-Fi transceiver. In accordance with such an example, the BT transceiver may communicate with display device 108 and/or DAQ 104 via a BT network, and the Wi-Fi transceiver may communicate with display device 108 and/or DAQ 104 via a Wi-Fi network.

Wireless transceiver 402 may also operate to relay communications from one device to another. In the case of having a single transceiver, data received from one device may be buffered internally prior to transmitting the data to another different device. In the case of having two or more transceivers, data received from one device on a first transceiver may be routed to the second transceiver for transmission to the another different device concurrently with reception of additional data on the first transceiver. In one embodiment, wireless transceiver may operate to relay vehicle diagnostic data obtained by diagnostic device 104 to display device 108 via wireless links 114 and 118, and/or may operate to relay instructions or commands (such as mode selection commands) from display device 108 to diagnostic device 104 via wireless links 114 and 118.

Wired interface 406 may comprise one or more wire-line ports. As an example, wired interface 406 may include wired ports 600 (illustrated in FIG. 6), wired ports 700, 702, and 704, and slot 706 (all illustrated in FIG. 7), some of which may be located under port cover 602.

Port 600 may be a vehicle interface port that communicatively connects the vehicle scanner 106 to the vehicle 102 via wired link 112. In that regard, wired link 112 may comprise a vehicle interface cable having two cable ends. A first cable end of the vehicle interface cable may include a connector that is connectable to and removable from port 600. A second cable end of the vehicle interface cable may include a connector that is connectable to and removable from a connector in the vehicle 102. The connector interface in the vehicle 102 may be arranged according to a particular connector standard, such as Society of Automotive Engineers (SAE) specification J-1962 or some other connector standard.

Ports 700 and 702 may comprise respective Ethernet ports. Each Ethernet port may communicatively connect to a first end of a respective Ethernet cable. A second end of a respective Ethernet cable may connect to an Ethernet port directly or indirectly connected to a local or wide area network (such as the Internet). Another respective Ethernet cable may connect the vehicle scanner 106 to the display device 108 via a corresponding Ethernet port provided on the display device 108. Ethernet ports 700 and 702 may additionally provide a path for upgrading internal program code within the vehicle scanner 106, such as CRPI 412.

Port 704 may comprise a USB port. The USB port 704 may communicatively connect to a first end of a USB cable (not shown). A second end of the USB cable may connect to a corresponding USB port provided on the display device 108. Alternatively, USB port 704 may connect the vehicle scanner 106 to a personal digital assistant (PDA) device. In this mode, the PDA may act as a USB master and provide instructions to and receive data from, the vehicle scanner 106. Further, in the event that a mass storage device (such as a flash memory stick) is plugged into the USB port 704, USB port 704 may provide data storage in addition to or in place of data storage device 408.

Slot 706 may be a memory card slot that allows additional storage capacity to be added to the vehicle scanner device 106 by insertion of a corresponding memory card, and/or allows propriety diagnostic programs to be loaded via memory card.

Wired interface 406 may further include a configurable set of switches and circuits in communication with port 600 in order to configure port 600 to properly communicate with a particular vehicle 102 under test. More specifically, because different makes and models of vehicles 102 utilize different signaling standards on their respective diagnostic port, wired interface 406 may include circuits and switches that allow the single port 600 to interface with a varying set of vehicle diagnostic port standards. For example, under the OBD II standard umbrella, signaling interfaces compliant with SAE J1850 PWM, SAE J1850 VPW, ISO 9141-2, ISO 14230 KWP2000, and ISO 15765 CAN could all potentially be used on vehicle 102. Switch information may be stored locally in data storage device 408 and, in response to receiving vehicle information from display device 108, processor 404 may retrieve and use the information to set switches and circuits to match the required signaling standard. Alternatively or additionally, vehicle scanner 106 may receive circuit and switch instructions via wireless transceiver 402 and/or wired interface 406 from display device 108 or from some other device.

Processor 404 may comprise one or more general purpose processors (e.g., INTEL microprocessors) and/or one or more special purpose processors (e.g., digital signal processors). Processor 404 may be configured to execute CRPI 412 that are contained in computer-readable data storage device 408 and which cause the processor 404 to perform the functionality described below.

Data storage device 408 may comprise a computer-readable storage medium readable by processor 404. Data storage device 408 may contain various data including, but not limited to, CRPI 412, vehicle scanner data 414, and vehicle diagnostic data 416. CRPI 412 may comprise program instructions for carrying out any one or more of the vehicle scanner 106 functions herein described. Vehicle scanner data 414 may include switch settings for configuring wired interface 406 or commands/data received from display device 108, for configuring wired interface 406 and communicating with the vehicle 102.

Vehicle scanner data 414 may further include data associated with a device that is arranged to communicate with vehicle scanner 106 via one or more wireless communication links. For example, vehicle scanner data 414 may include data associated with one of the DAQ 104 and display device 108, such as a radio identifier, MAC address, security key, and/or password information. The associated data may be received at vehicle scanner 106, for storing as vehicle scanner data 414, during a pairing process carried out between display device 108 and the vehicle scanner 106, or between the DAQ 104 and the vehicle scanner 106. For example, the pairing process between vehicle scanner 106 and display device 108 may include vehicle scanner 106 providing display device 108 with the data associated with vehicle scanner 106 and display device 108 providing vehicle scanner 106 with data associated with display device 108. After carrying out the pairing process, vehicle scanner 106 may use the stored pairing data in establishing the communication link 118 with display device 108. Vehicle scanner data 414 may also include data associated with DAQ 104 and other devices not illustrated in the figures.

Vehicle diagnostic data 416 may include vehicle diagnostic data received from the vehicle 102, including for example, sensor data or error code data. Other data retrieved from the vehicle 102 could also be stored in vehicle diagnostic data 416.

Data storage device 408 may be permanent internal storage comprised of, for example, magnetic or semiconductor-based memory, and/or may be a removable memory device, such as a flash card or USB memory stick, or may comprise a combination of the above. Data storage device 408 may comprise a removable card or stick inserted into one or more of USB port 1308 and/or a memory card inserted into memory card slot 1306. Other types of storage could also be used.

Next, FIG. 5 illustrates a front view of an example embodiment of vehicle scanner 106. As set forth in FIG. 5, the front face of vehicle scanner 106 includes visual indicators 502-514 and side grips 516. Visual indicators 502, 504, and 506, which may be part of user interface 400, may comprise respective light emitting diodes (LEDs) or some other visual indictor that is operable to convey information to a user. Data storage device 408 may include CRPI executable by processor 404 to turn visual indicators 502, 504, and 506 on and off to reflect a corresponding status of the vehicle scanner 106.

Visual indicator 502 may turn on to indicate that vehicle scanner 106 is receiving electrical power from vehicle 102. Because vehicle scanner 106 may not include its own power source, it may rely upon vehicle 102 to provide it with operating power via vehicle interface port 600. If visual indicator 502 fails to light after connecting vehicle scanner 106 to the vehicle 102, a repair technician may know to test the vehicle's electrical system. Absent another power source, such as a local battery power source, vehicle scanner 106 may fail to operate. Alternatively, vehicle scanner 106 may be provided with a battery to allow operation without relying on vehicle 102's power supply.

Visual indicator 504 may turn on and off in a periodic manner so as to flash (e.g., turn on for 1 second and then turn off for 1 second). In particular, visual indicator 504 may flash in specific sequences so as to identify any of a variety of diagnostic or error codes. The diagnostic codes, for example, could pertain to (i) an error in the vehicle 102, (ii) an error within the vehicle scanner 106, (iii) an error communicating with display device 108, or (iv) some other error/status. As an example, visual indicator 502 may flash 3 times, wait, and then flash 2 more times, so as to visually present a diagnostic code of 32, which could imply that a wireless connection with display device 108 has failed or that no network path to display device 108 can be found.

Visual indicator 506 may turn on to indicate that vehicle scanner 106 is carrying out communications with vehicle 102. More specifically, visual indicator 506 may turn on to indicate that vehicle scanner 106 is presently carrying out communications with at least one electronic control unit (ECU) within the vehicle 102, and visual indicator 506 may turn off to indicate that vehicle scanner 106 is not presently carrying out communications with at least one ECU within the vehicle 102.

Visual indicator 508 is an orientation indicator, providing an indicator to a repair technician of the side of the vehicle scanner 106 that the vehicle connector port 600 can be found (See FIG. 6).

Figure 7:
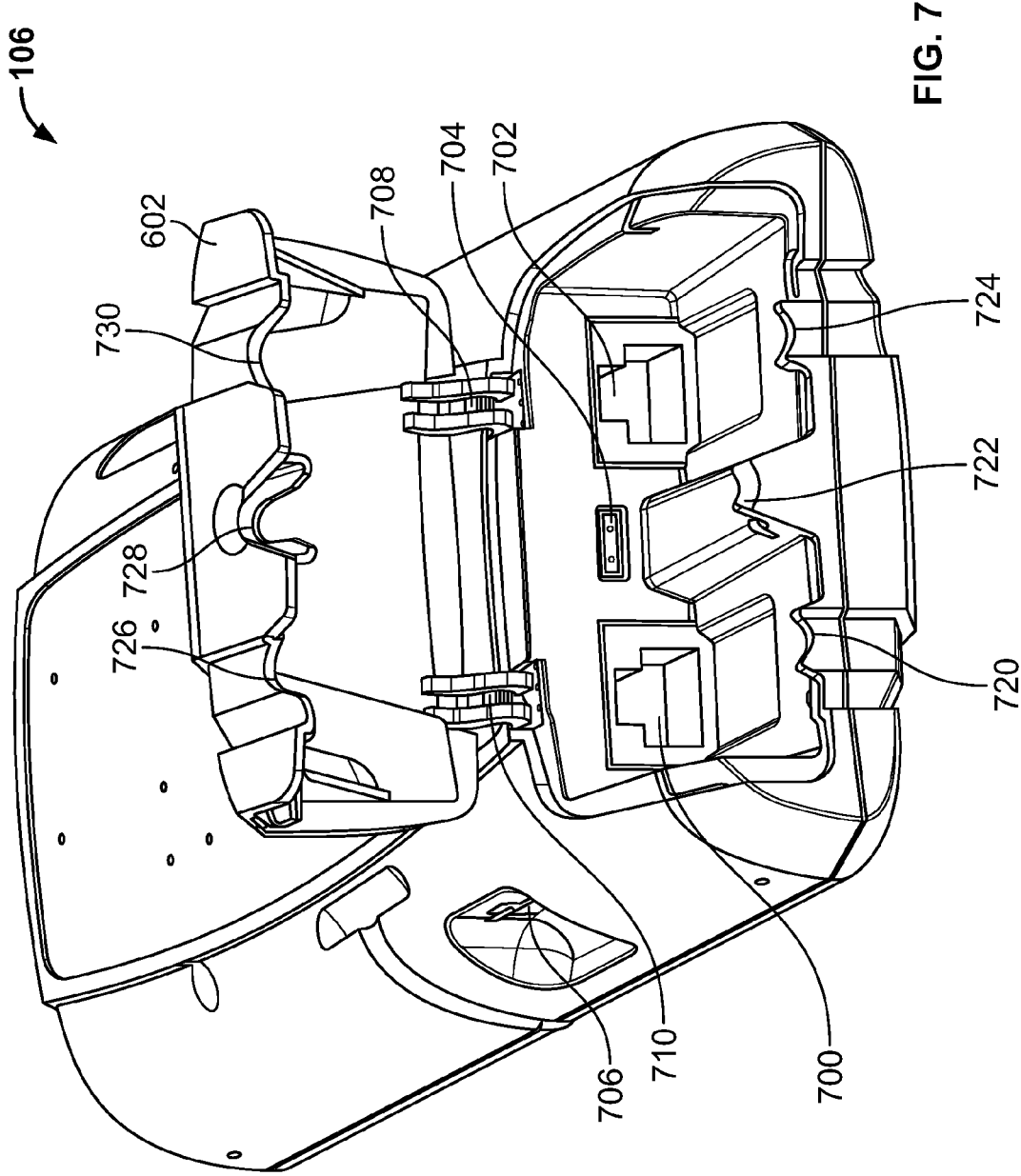

Visual indicators 510 and 514 are communication port activity indicators, and provide an indication of communications activity on the respective Ethernet ports 700 and 702 (See FIG. 7). Visual indicators 510 and 514 may flash with a periodic intensity relative to a rate of data being communicated over Ethernet ports 700 and 702. Visual indicator 512 is another communication port activity indicator, but instead provides an indication of communications activity on the USB port 704 (See FIG. 7). Visual indicator 512 may light up when a USB cable is present and properly connects vehicle scanner 106 to another active device, such as display device 108 or a PDA device. Other methods of providing visual indicators are also possible.

Although not shown, any one of the visual indicators noted above could be replaced by an audio indicator. For example, visual indicator 504 could be replaced with a speaker (or with an audio jack for connecting some other device that converts electrical signals into audio signals) that emits a continuous or periodic audio tone to indicate a corresponding diagnostic or error code.

Grips 516 are arranged along the two longitudinal ends of the vehicle scanner, and may function to keep access port cover 602 (See FIG. 7) closed and to provide shock absorption in the event that the vehicle scanner 106 is dropped or struck. Grips 516 may be formed as a single piece of rubber connected along a rear or end of the vehicle scanner 106, or may be formed as two separate pieces of rubber. Materials other than rubber could alternatively be used. Grips 516 may be removed away from the vehicle scanner to open access port cover 602.

FIG. 6 is a perspective view of the rear face of the vehicle scanner 106 with grips 516 removed and illustrates vehicle interface port 600, connector mounting holes 601, access port cover 602, and upper cover 604. Port 600 may include a high-density-26 (HD-26) connector, but is not so limited. An HD-26 connector may include 26 male or female connector terminals. Port 600 is arranged to facilitate a wire-line connection to vehicle 102 via wired link 112. Wired link 112 may comprise a cable that includes fasteners that are arranged to fasten one end of the cable to vehicle scanner 106 via connector mounting holes 601. The other end of the cable may include similar fasteners to rigidly secure the cable to the vehicle's 102 diagnostic port.

Upper cover 604 may cover, and provide access to when removed, an expansion port that allows the functionality of the vehicle scanner 106 to be upgraded and/or revised. An expansion circuit board may comprise, for example, a printed circuit board (PCB) containing a plurality of discrete circuit elements and/or one or more integrated circuits (ICs). Various expansion circuit boards 1202 may be interfaced with vehicle scanner 106 to provide additional and/or more robust functionality without the need to manufacture an entirely new vehicle scanner 106 device.

FIG. 7 illustrates a vehicle scanner 106 with its access port cover 602 placed in an open position. As set forth in FIG. 7, access port cover 602 may be hingedly attached to the vehicle scanner 106 via hinges 708 and 710. Hinges 708 and 710 are rotatable so as to allow port access cover 602 to move from the open position to the closed position and from the closed position to the open position. Channels 720-724 formed in a bottom surface of the vehicle scanner 106 and corresponding channels 726-730 formed in the access port cover 602 form cable openings when access port cover 602 is in the closed position and allow cables to exit the vehicle scanner 106 while the access port cover 602 is in the closed position.

While the access port cover 602 is open, access is provided to Ethernet ports 700 and 702 and to USB port 704. In alternative embodiments, the ports accessible via access port cover 602 may include a different quantity, or may include different types of ports, including, for example, Firewire and/or eSATA ports. Vehicle scanner 106 may include a respective cable opening for each port accessible via access port cover 602. Alternatively, one or more cable openings may allow multiple cables to pass through access port cover 602.

A memory card slot 706 may be provided on a longitudinal side of vehicle scanner 106 and accessible by removing grips 516. A memory card inserted in memory card slot 706 may provide data storage 408 for vehicle scanner 106, or may provide removable data storage in addition to separate data storage 408 provided permanently inside vehicle scanner 106. A memory card for insertion in the memory card slot 706 may include, for example, a Compact Flash card, an SD memory card, a mini SD memory card, an xD card, or other type of memory card. Whether a memory card inserted in memory card slot 706 comprises the data storage 408 or an alternative data store, the memory card may provide CRPI for execution by processor 404 of the vehicle scanner 106. The removable memory card may also provide storage space for storage of vehicle diagnostic data 416, in place of data storage device 408, or in addition to data storage device 408.

Figure 8:
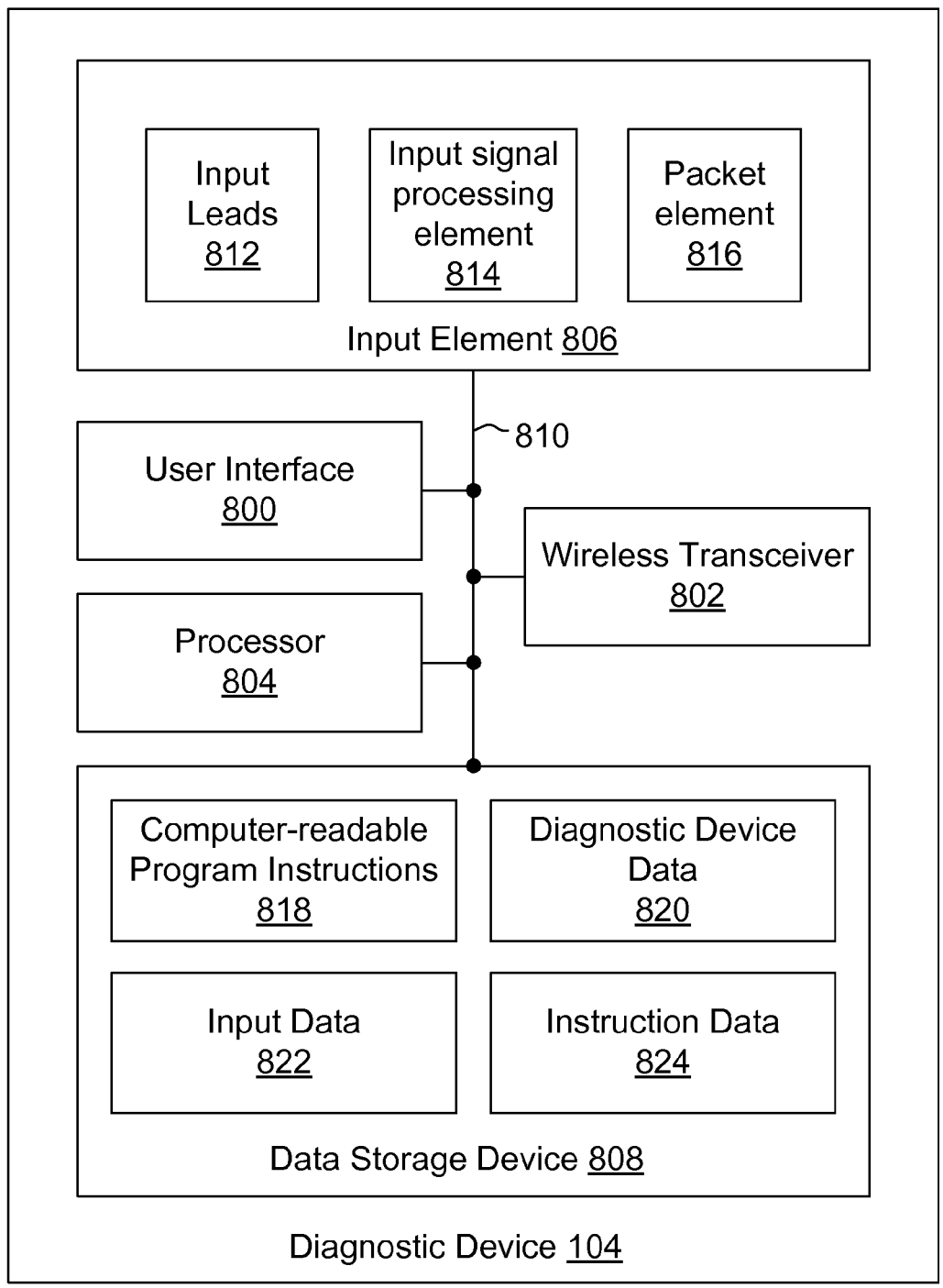
FIG. 8 is a block diagram of a second example diagnostic device (a data acquisition device (DAQ))
Figure 9:
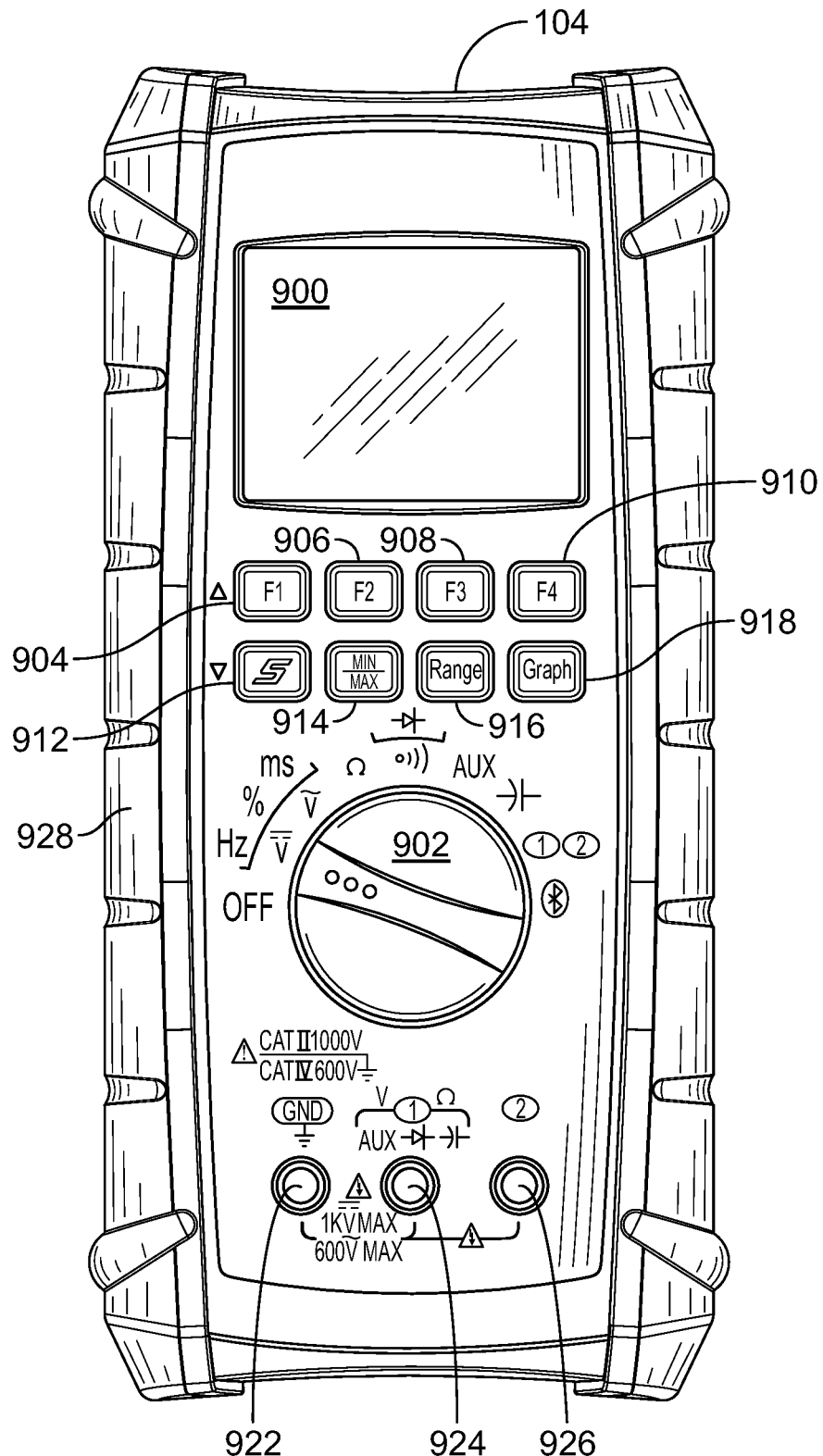
FIG. 9 illustrates a view of the example vehicle DAQ of FIG. 8.

Next, FIG. 8 illustrates a block diagram of diagnostic device 104, and FIG. 9 illustrates details of an example embodiment of diagnostic device 104. As illustrated in FIG. 9, diagnostic device 104 includes a user interface 800, a wireless transceiver 802, a processor 804, an input element 806, and a data storage device 808, all of which may be linked together via a system bus, network, or other connection mechanism 810. As set forth above, diagnostic device 104 may be a DAQ configured to take measurements from the vehicle 102, including, for example, direct current (DC) voltage readings, alternating voltage (AC) voltage readings, and/or resistance readings. The DAQ 104 may also provide test modes such as a diode test/continuity test mode and a capacitance test mode. Other functions may also be provided.

User interface 800 is operable to present data to a user and to allow a user to enter selections (e.g., mode selections and sub-mode selections). User interface 800 may include a display 900 that is illustrated in FIG. 9. Display 900 is operable to visually present data, such as data obtained and/or generated by input element 806, data obtained via wireless transceiver 802, and/or data contained in data storage device 808. User interface 800 may include a mode selector for selecting one or more modes and/or sub-modes of DAQ 104. Example mode selectors 902, 904, 906, 908, 910, 912, 914, 916, and 918 are illustrated in FIG. 9.

Wireless transceiver 802 may comprise a single wireless transceiver that is operable to carry out communications via communications links 114, 116. Wireless transceiver 802 may carry out communications with vehicle scanner 106, display device 108, and/or some other device that is operating within a wireless communications range of vehicle scanner 106. As an example, wireless transceiver 802 may comprise a BT transceiver, a Wi-Fi transceiver, or some other type of wireless transceiver.

Alternatively, wireless transceiver 802 may comprise multiple wireless transceivers. For example, wireless transceiver 802 may comprise two wireless transceivers that communicate according to a common air interface protocol or different air interface protocols. Those air interface protocols may be selected from a BT air interface protocol, a Wi-Fi air interface protocol, and some other air interface protocol. In accordance with an embodiment in which wireless transceiver 802 includes two transceivers, a BT transceiver may communicate with vehicle scanner 106 and/or display device 108 via a BT network, and a Wi-Fi transceiver may communicate with vehicle scanner 106 and/or display device 108 via a Wi-Fi network.

Processor 804 may comprise one or more general purpose processors (e.g., INTEL microprocessors) and/or one or more special purpose processors (e.g., digital signal processors). Processor 804 may execute CRPI 818 that are contained in computer-readable data storage device 808.

Input element 806 may include (i) one or more input leads 812, (ii) an input signal processing element 814 that is operable to convert input signals obtained via input leads 812 into input data, and (iii) a packet-element 816. Each input lead 812 is operable to receive input signals from an input signal acquisition point. The input signal acquisition point may comprise any of a variety of locations at which an input signal can be acquired. In accordance with an example, the input signal acquisition point may comprise a location on the vehicle 102 at which a voltage signal, current signal, air pressure signal, air temperature signal, oil pressure signal, oil temperature signal, exhaust composition signal, or some other input signal can be acquired.

Each input lead 812 may include a first end and a second end. The first end of each input lead 812 may be inserted into or otherwise attached to DAQ 104. The first end of each input lead may comprise a banana plug screw. The second end of each input lead 812 may be arranged in any of a variety of configurations. As an example, a configuration of the second end may comprise a configuration that includes (i) an alligator clip, such as an MTA85 alligator clip sold by Snap-on Incorporated, Kenosha, Wis., United States, (ii) a spring hook, such as an MTA80 spring hook sold by Snap-on Incorporated, (iii) a test probe, such as an MTA20 test probe sold by Snap-on Incorporated, or (iv) a backprobe, such as an MTTL7005 backprobe sold by Snap-on Incorporated. Other example configurations of the second end of an input lead 812 are also possible.

Input element 806 may include an input signal processing element 814 that is operable to convert an input signal received via one or more input leads 812 into data that is displayable at display 900. As an example, input signal processing element 814 may include an analog-to-digital converter.

Packet-element 816 may be operable to packetize the input data (e.g., place the input data into data packets) so as to generate data packets containing the input data. Packet-element 816 may provide the data packets to wireless transceiver 802 via connection mechanism 810 for subsequent transmission of the data packets via an air interface. In an alternative embodiment, processor 804 or some other portion of DAQ 104 can comprise packet-element 816 or carry out the functions of packet-element 816.

Data storage device 808 may comprise a computer-readable storage medium readable by processor 804. The computer-readable storage medium may comprise volatile and/or non-volatile storage components, such as optical, magnetic, organic or other memory or disc storage, which can be integrated in whole or in part with processor 804. Data storage device 808 may contain various computer-readable data, such as CRPI 818, diagnostic device data 820, input data 822, and instruction data 824.

Diagnostic device data 820 may include data associated with a device that is arranged to communicate with DAQ 104 via a wireless network. For example, diagnostic device data 820 may include data associated with display device 108, such as a radio identifier and password associated with display device 108. The data associated with display device 108 may be received at DAQ 104, for storing as diagnostic device data 820, during a pairing process carried out between display device 108 and DAQ 104. The pairing process between DAQ 104 and display device 108 may include DAQ 104 providing display device 108 with the data associated with DAQ 104 and display device 108 providing DAQ 104 with data associated with display device 108. After carrying out the pairing process with display device 108, DAQ 104 may use the diagnostic device data 820 when establishing communication link 116 with display device 108.

Diagnostic device data 820 is not limited to data associated with one device. In that regard, diagnostic device data 820 may include respective data associated with each of a plurality of devices, including, for example, data associated with vehicle scanner 106. The data associated with vehicle scanner 106 may include a radio identifier and password associated with vehicle scanner 106. The data associated with vehicle scanner 106 may be received at DAQ 104, for storing as diagnostic device data 820, during a pairing process carried out between DAQ 104 and vehicle scanner 106. The pairing process between DAQ 104 and vehicle scanner 106 may include vehicle scanner 106 providing DAQ 104 with the data associated with vehicle scanner 106 and DAQ 104 providing vehicle scanner 106 with data associated with DAQ 104. After carrying out the pairing process with vehicle scanner 106, DAQ 104 may use the diagnostic device data 820 when establishing wireless communications link 114 with vehicle scanner 106.

Input data 822 may comprise data generated by input signal processing element 814. A portion of data storage device 808 that contains input data 822 may function as a buffer to store input data for display on display 900 and/or for transmission to display device 108 via wireless communications link 116.

Instruction data 824 may comprise data that identifies how to connect a portion of the DAQ 104 to vehicle 102, how to operate vehicle 102, inspections to carry out on vehicle 102, or some other instruction data. Instruction data 824 may comprise various data including numbers, letters, punctuation marks, pictures, graphs, or some other visually presentable form of data.

CRPI 818 may include program instructions (referred to herein as PI-818-A) that are executable to change an operating state of wireless transceiver 802. Processor 804 may execute PI-818-A in response to mode selector 902 (illustrated in FIG. 9) changing between a local-control mode and a remote-control mode. Execution of PI-818-A may cause a transceiver or transceivers of wireless transceiver 802 to transition to a transceiver-on-state in response to mode-selector 902 changing to a remote-control mode from a local-control mode. Similarly, execution of PI-818-A may cause a transceiver or transceivers of wireless transceiver 802 to transition to a transceiver-off-state in response to mode-selector 902 changing to a local-control mode from a remote-control mode.

CRPI 818 may also include program instructions (referred to herein as PI-818-B) that are executable to determine a desired mode for DAQ 104 responsive to receiving a mode selection command from display device 108. If DAQ 104 is operating in the desired mode as indicated in the mode selection command, execution of PI-818-B allows DAQ 104 to continue operating in the desired mode. On the other hand, if DAQ 104 is operating in a mode different than the desired mode as indicated in the mode selection command, execution of PI-818-B causes DAQ 104 to transition to the desired mode.

CRPI 818 may further include program instructions (referred to herein as PI-818-C) that are executable to cause display 900 to display instruction data. In one respect, execution of PI-818-C may cause display 900 to display instruction data 824 so as to guide a repair technician in connecting input leads 812 to vehicle 102. In another respect, execution of PI-818-C may cause display 900 to display instruction data (such as instruction data 218) that is received from display device 108 via transceiver 802.

Next, FIG. 9 illustrates a front view of the example embodiment of DAQ 104, and in particular, elements of user interface 800 and input element 806. As set forth above, elements of user interface 800 may include display 900 and mode selectors 902, 904, 906, 908, 910, 912, 914, 916, and 918. Elements of input element 806 may include ports 922, 924, and 926.

Display 900 may comprise a liquid crystal display (LCD), a plasma display, an electrophoretic display, or some other type of display. Display 900 is operable to visually present (e.g., display) data to a repair technician. Display 900 may visually present data using numbers, letters, punctuation marks, pictures, graphs, or some other visually presentable form of data. The data visually presented at display 900 may include locally-acquired data (LAD), such as data acquired via input element 806 (e.g., via input leads 812) and/or data contained in data storage device 808. The data visually presented at display 900 may include remotely-acquired data (RAD), such as data acquired via wireless transceiver 802 from one or more of display device 108 and vehicle scanner 106.

Mode selector 902 comprises a switch having multiple mode-positions. Mode selector 902 may comprise a rotary switch having nine mode-positions, but is not so limited. Each mode-position of mode selector 902 is associated with one or more modes (e.g., an off mode, a voltmeter mode, an ammeter mode, and a remote control mode, to name a few), and each of the mode-positions may be associated with one or more symbols that identify the mode(s) associated with that mode-position. Table 2 provides an example list of modes associated with each mode-position of mode selector 902, and an example list of whether each mode is a local-control mode (e.g., a mode selected by mode selector 902) or a remote-control mode (e.g., a mode selected by display device 108).

TABLE 2

| Mode-position | Mode Control Type | Mode |
| --- | --- | --- |
| 1 | Local-Control | Off |
| 2 | Local-Control | DC Voltmeter mode |
| 3 | Local-Control | AC Voltmeter mode |
| 4 | Local-Control | Ohm-meter mode |
| 5 | Local-Control | Diode/Continuity Test mode |
| 6 | Local-Control | Auxiliary mode |
| 7 | Local-Control | Capacitance mode |
| 8 | Local-Control | Oscilloscope mode |
| 9 | Remote-Control | Various modes |

Mode-position 1 is associated with the symbol "OFF." The mode-position numbers increase in a clockwise direction. The three circles on mode selector 902 are closest to a currently-selected mode position. In FIG. 9, mode-position 2 (DC Voltmeter mode) is the currently-selected mode-position.

Mode selector 902 may be turned to each of the nine mode-positions. Turning mode selector 902 from a first mode-position (not necessarily mode-position 1) to a second mode-position (not necessarily mode-position 2) causes diagnostic device 104 to transition from a first mode that is associated with the first mode-position to a second mode that is associated with the second mode-position. Transitioning from the first mode to the second mode may be carried out, at least in part, by processor 804 executing program instructions of CRPI 818.

Transitioning from a local-control mode to a remote-control mode may cause wireless transceiver 802 to transition from the transceiver-off-state to the transceiver-on-state. Processor 804 may execute IP-818-A in response to detecting mode selector 902 changing to a remote-control mode from a local-control mode.

Conversely, transitioning from a remote-control mode to a local-control mode may cause wireless transceiver 802 to transition from the transceiver-on-state to the transceiver-off-state. Processor 804 may execute IP-812-A in response to detecting mode selector 902 changing to a local-control mode from a remote-control mode.

While mode selector 902 is positioned at a mode-position corresponding to a remote-control mode, wireless transceiver 802 may receive a mode-selection command from display device 108. The mode-selection command may be unsolicited or may be received in response to wireless transceiver 802 transmitting to display device 108 a request for a mode-selection command. The mode-selection command received at wireless transceiver 802 may include a mode field that identifies a desired local-control mode that is selectable via mode selector 902. The mode field may also identify a sub-mode that is selectable via one of mode selectors 904, 906, 908, 910, 912, 914, 916, and 918 when mode selector 902 is in a local-control mode position.

Mode selectors 904, 906, 908, 910, 912, 914, 916, and 918 may each comprise a respective push button, but are not so limited. Pushing, or pushing and releasing, one of those mode selectors may cause DAQ 104 to transition to a mode and/or sub-mode associated with that mode selector. One or more of mode selectors 904, 906, 908, 910, 912, 914, 916, and 918 may be associated with multiple modes and/or multiple sub-modes. For example, mode selectors 904, 906, 908, and 910 may be associated with a respective first sub-mode while mode selector 902 positioned at mode-position 2 and may be associated with a second different sub-mode while mode selector 902 is positioned at mode-position 3. One or more of mode selectors 904, 906, 908, 910, 912, 914, 916, and 918 may be associated with a remote-control mode. For instance, mode selector 904 may associated with a remote-control mode. In that regard, pushing, or pushing and releasing, mode selector 904 may cause DAQ 104 to transition from a local-control mode to a remote-control mode in the same way as if mode selector 902 was moved to mode position 9.

Ports 922, 924, and 926 may be operable to receive a respective input lead. Each input lead can include first and second ends. The first end of an input lead may comprise a banana plug. Ports 922, 924, and 926 may include a respective female banana connector for receiving the banana plug of an input lead. The second end of each input lead may include an alligator clip, a quick-attach probe, or some other device for contacting an input signal acquisition point.

Grips 928 are arranged along the two longitudinal ends of the DAQ 104, and provide shock absorption in the event that the DAQ 104 is dropped or struck. Grips 928 may be formed as a single piece of rubber connected along a rear or end of the DAQ 104, or may be formed as two separate pieces of rubber. Materials other than rubber could alternatively be used.

II. Example Operation

Figure 10:
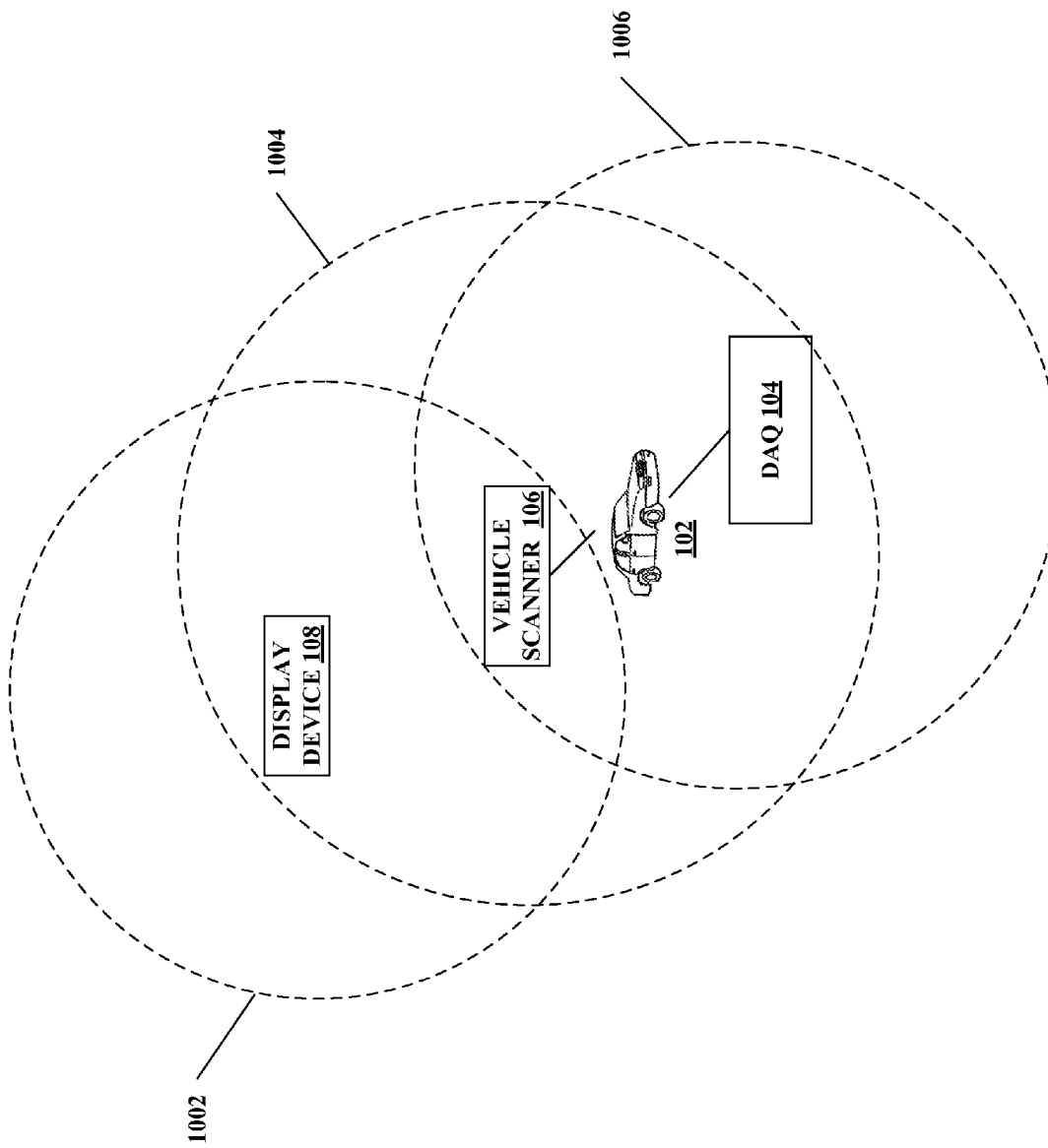
FIG. 10 illustrates a coverage map in accordance with an example system.
Figure 11:
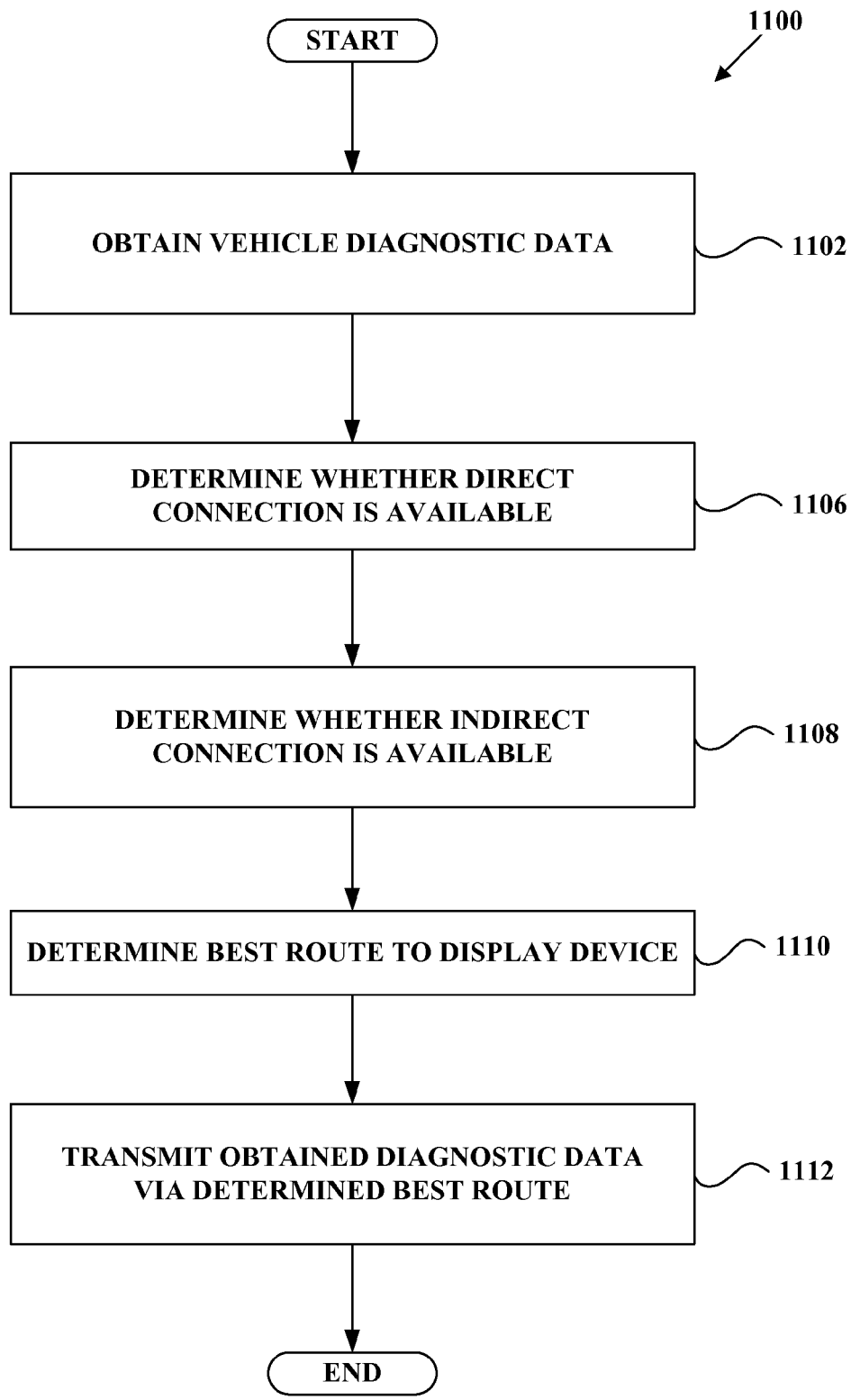
FIG. 11 illustrates a process flow that a diagnostic device may execute in accordance with an embodiment.

FIG. 10 illustrates a coverage map in accordance with an example system, and FIG. 11 illustrates a process flow that a diagnostic device 104, 106 may execute in accordance with an embodiment.

As set forth in FIG. 10, each of display device 108, diagnostic device 104, and diagnostic device 106 include a wireless transceiver having a particular transmission range. Although transmission ranges are shown in the shape of a circle in FIG. 10 for ease of illustration, actual transmission range zones will vary in view of obstacles such as walls and in view of other nearby interfering RF devices. Furthermore, and again for ease of description, diagnostic device 104 is illustrated as a DAQ and diagnostic device 106 is illustrated as a vehicle scanner in FIG. 10. Other arrangements of display devices and diagnostic devices could also be used, and different numbers of display devices 108 and diagnostic devices 104, 106 could also be used.

Wireless transceiver 202 of display device 108 is illustrated in FIG. 10 as having a transmission range indicated by the dotted circumference 1002. Wireless transceiver 402 of vehicle scanner 106 is illustrated in FIG. 10 as having a transmission range indicated by the dotted circumference 1004. Wireless transceiver 802 of DAQ 104 is illustrated in FIG. 10 as having a transmission range indicated by the dotted circumference 1006.

In the arrangement of FIG. 10, transmission range 1002 of display device 108 encompasses vehicle scanner 106 but not DAQ 104. Transmission range 1004 of vehicle scanner 106 encompasses both the display device 108 and DAQ 104. Transmission range 1006 of DAQ 104 encompasses vehicle scanner 106 but not display device 108. Other arrangements of devices and transmission ranges are also possible.

Although a particular arrangement is shown in FIG. 10 in which only transceiver 402 of the vehicle scanner 106 is in a position to relay data from one device to another, each respective wireless transceiver 202, 402, and 802 may operate to relay communications from one respective device 108, 106, and 104 to another in various alternative arrangements of devices, and in other embodiments, may be arranged to relay in such a manner.

In the case of having a single transceiver, data received from one device may be buffered internally prior to transmitting the data to another different device using the same transceiver. In the case of having two or more transceivers, data received from one device on a first transceiver may be routed to a second transceiver for transmission to the another different device concurrently with reception of additional data on the first transceiver. Data frames received from one device may include an immediate medium access control (MAC) destination device of the receiving device, but may contain an ultimate destination address of the another different device embedded or encapsulated within the frame. Processor 204, perhaps configured by CRPI 212, may then determine whether a path exists to forward the data to the ultimate destination address of the another different device. If a path exists, the data may be forwarded towards the ultimate destination address via a corresponding wireless transceiver. If a path does not exist, the frame may be dropped, an error message sent back to the source device via a corresponding wireless transceiver, or some other action taken.

Various methods of determining which diagnostic devices are within transmission range of display device 108 may be used. For example, from time to time, and perhaps periodically, a wireless transceiver capable of reaching display device 108 directly, such as the wireless transceiver 402 of the vehicle scanner 106 in FIG. 10, may transmit a broadcast packet indicating its ability to reach display device 108 directly and to act as a relay agent for display device 108. Additionally or alternatively, and from time to time, wireless transceiver 402 may receive and respond to a broadcast packet from another diagnostic device, such as DAQ 104, looking for devices that can reach display device 108. Other methods could also be used.

FIG. 11 is a flowchart illustrating an exemplary operation 1100 of diagnostic devices 104, 106 and display device 108. FIG. 11 is exemplary in nature. Accordingly, although FIG. 11 illustrates a number of steps in a particular order, some steps could be executed in an order different than that set forth in FIG. 11. Furthermore, additional steps may be added to the operation 1100. Alternatively, a subset of the steps set forth in operation 1100 may be executed. The set of functions 1100 may be carried out via a custom designed ASIC within one or more of the diagnostic devices 104, 106 and display device 108, or may be carried out by one or more of processors 204, 404, and 804 executing respective CRPIs that implement the functions of FIG. 11.

As set forth in step 1102, a diagnostic device such as DAQ 104 first establishes a wired connection 110 with the vehicle 102 under test and obtains vehicle diagnostic data from the vehicle 102. The wired connection 110 may be a lead connecting one of ports 922-926 of DAQ 104 with the vehicle 102, and the vehicle diagnostic data may be, for example, a voltage.

At step 1106, DAQ 104 determines whether it can directly wirelessly connect with display device 108. In accordance with the transmission range 1006 shown in the embodiment of FIG. 10, DAQ 104 can not directly wirelessly connect with display device 108. DAQ 104 may be unable to directly wirelessly connect with display device 108 for any number of reasons. For example, display device 108 may have been moved outside of DAQ 104's transmission range, DAQ 104 may have insufficient transmit power to reach display device 108, or perhaps another device in the vicinity is producing sufficient interference to reduce the range 1006 of DAQ 104's transceiver 802. In some embodiments, method 1100 may not include step 1106, but rather may proceed from step 1102 directly to step 1108.

Next, at step 1108, DAQ 104 determines whether an indirect connection to display device 108 is available. DAQ 104 may have prior knowledge that an indirect connection to display device 108 is available through vehicle scanner 106 after receiving a broadcast packet from vehicle scanner 106 indicating that it is within range of display device 108 and is available to relay packets to display device 108. Alternatively, DAQ 104 may transmit its own broadcast packet in step 1108, or prior to step 1108, requesting a response from any diagnostic device within its transmission range 1006 that is capable of relaying packets to display device 108. In response to receiving the broadcast packet, vehicle scanner 106 may reply by transmitting its own broadcast or unicast packet indicating that it is within range of display device 108 and is available to relay packets to display device 108.

Of course, it is not required that vehicle scanner 106 be wirelessly connected to display device 108. In one embodiment, vehicle scanner 106 may be connected to display device 108 via its wired interface 406, which may include, for example, a USB connection and/or an Ethernet connection. In the same way as above, vehicle scanner 106 may broadcast its ability to relay packets to display device 108 via its wired interface 406. Packets received via wireless transceiver 402 may then be routed over bus 410 to wired interface 406 and relayed to display device 108 over a wired connection via wired interface 406.

The exchange of information between diagnostic devices 104 and 106 may also include additional information, such as battery source and/or battery power remaining. For example, in the event that vehicle scanner 106 is operating off of an external power source such as vehicle 102's battery, it may so indicate to DAQ 104 in a broadcast or unicast packet. Alternatively, in the event that vehicle scanner 106 is operating off of local battery power, it may so indicate to DAQ 104 in a broadcast or unicast packet, and may further indicate an estimated amount of battery power remaining.

In step 1110, DAQ 104 determines the best route to display device 108. In the event that only one of a direct wireless connection and an indirect wireless connection to display device 108 is available, DAQ 104 uses the one available connection. This may include a situation where DAQ 104 determines that a prior available direct connection with display device 108 has been interrupted. Responsive to detecting the interruption, DAQ 104 routes data indirectly to display device 108 via an indirect connection. Subsequently, responsive to determining that the direct wireless connection with the display device 108 has been restored, DAQ 104 may stop transmitting data via the indirect wireless connection and start transmitting data to display device 108 via the direct wireless connection.

As shown in FIG. 10, a direct wireless connection between DAQ 104 and display device 108 is not available due to transmission range limitations of the DAQ's 104 transceiver 802. Therefore, the only path to route obtained vehicle diagnostic data to display device 108 is via vehicle scanner 106, where vehicle scanner 106 acts as a relay agent to route the vehicle diagnostic data to the display device 108 on behalf of the DAQ 104.

In an alternative embodiment, and in the event that transmission range 1006 of DAQ 104 reaches both vehicle scanner 106 and display device 108, DAQ 104 may take into account additional considerations in determining a best route to display device 108. For example, DAQ 104 may take into account the relative transmission power required to transmit directly to display device 108 and to transmit indirectly to vehicle scanner 106, and then transmit to the device that requires a lower transmission power.

Required transmission power could be determined in a number of ways. For example, DAQ 104 may transmit a packet requiring an acknowledgment to each of the display device 108 and the vehicle scanner 106 at ever increasing transmission power levels until the DAQ 104 receives an ACK frame from the respective device. The point at which an acknowledgment frame is received may provide an indication of a transmission power level needed to reach the display device 108.

Alternatively, DAQ 104 may receive a packet from each of display device 108 and the vehicle scanner 106 that includes an indication of the power level that each packet was transmitted at. By measuring the power level of the received packet and the indication of the power level at which the packet was transmitted, DAQ 104 can make a determination of a transmission power level needed to reach each of the respective display device 108 and DAQ 104. Other methods of calculating required transmission power levels could also be used.

An additional consideration that DAQ 104 may take into account is respective battery power source types and levels. For example, if DAQ 104 is running on battery power and DAQ 104 determines that vehicle scanner 106 is running on an external power source such as vehicle 102's battery, DAQ 104 may determine that the best route to display device 108 is through a shorter transmission path to vehicle scanner 106. This embodiment saves battery power at the DAQ 104 by utilizing the external power source available at vehicle scanner 106 to complete the transmission to display device 108.

Alternatively, if DAQ 104 determines that vehicle scanner 106 is also operating on a local battery power source, DAQ 104 may use relative battery power level information to determine the best route to display device 108. For example, if DAQ 104 is provided with battery level information from vehicle scanner 106 indicating that vehicle scanner 106's battery power level is at 50%, and DAQ 104 knows its own battery power level is at 90%, it may determine that the best route is to transmit directly to display device 108 despite the fact that a higher transmission power level will be required than to transmit indirectly via vehicle scanner 106. Assuming that the relative battery power levels are switched, and DAQ 104 knows its own battery power level is at 50% and the vehicle scanner 106 is operating on battery power having a power level at 90%, DAQ 104 may determine that the best route is to transmit indirectly via vehicle scanner 106. This embodiment saves battery power at the DAQ 104 by utilizing the higher battery power level available at vehicle scanner 106 to complete the transmission to display device 108.

At step 1112, DAQ 104 transmits the obtained vehicle diagnostic data via the determined best route. In the case of FIG. 10, the determined best route is to transmit the vehicle diagnostic data to the display device 108 indirectly via the vehicle scanner 106 because that is the only route available. In other embodiments, and based on additional considerations and/or various re-arrangements of diagnostic devices, the determined best route could be an indirect or a direct wireless connection to display device 108, and could involve one or more intermediate relay devices.

While FIG. 11 is directed to a transmission of vehicle diagnostic data from a diagnostic device 104, 106 to a display device 108, any and all of the principles described above could just as well be applied in the opposite direction, e.g., transmissions of commands, instructions, and/or data from display device 108 to diagnostic devices 104, 106.

Figure 12:
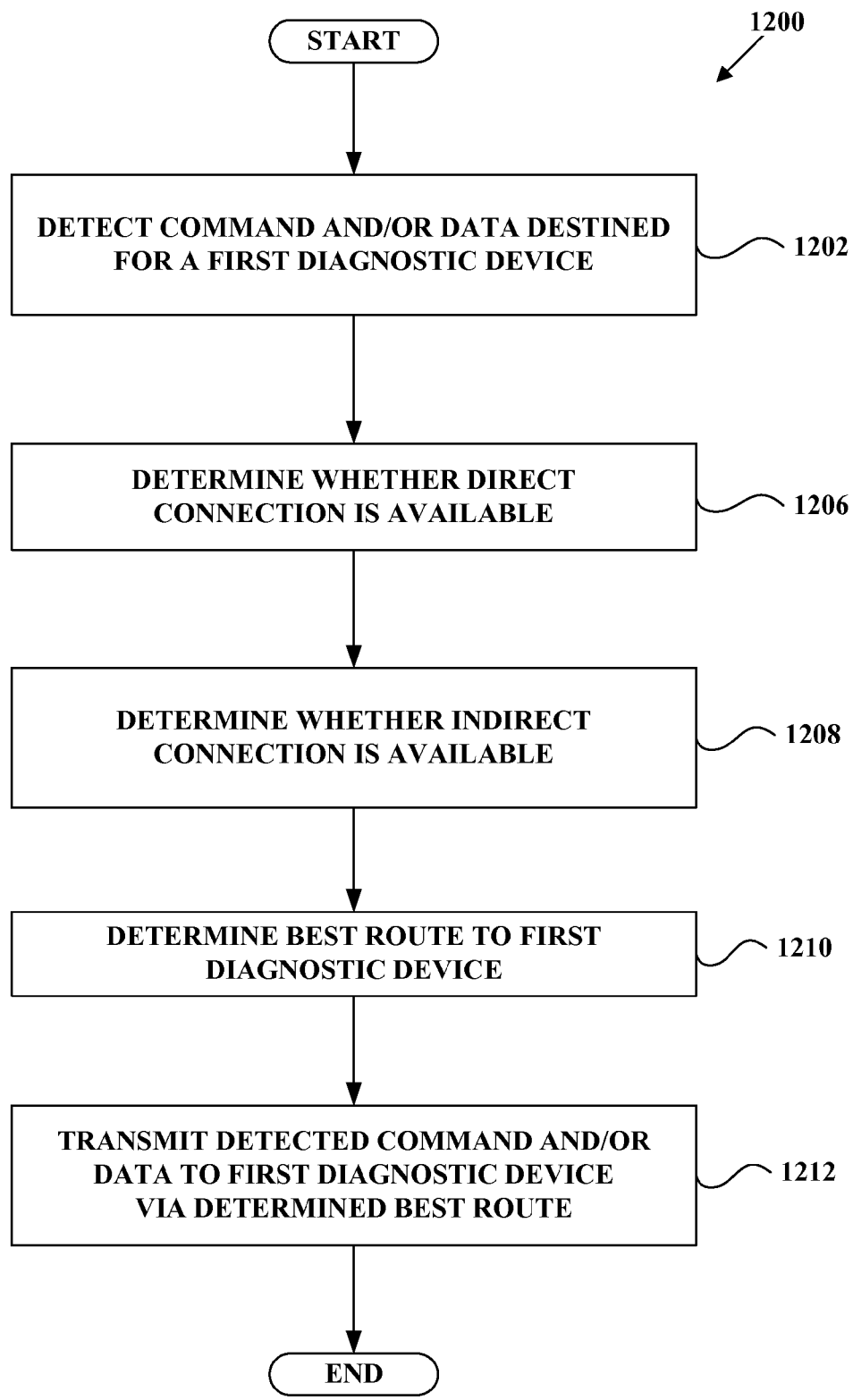
FIG. 12 illustrates a process flow that a display device may execute in accordance with an embodiment.

FIG. 12 describes an example flow of diagnostic communications from display device 108 to a first one of the diagnostic devices 104, 106. For example, in the arrangement shown in FIG. 10, if display device 108 wishes to take control of DAQ 104 and place DAQ 104 in a remote control mode, it may do so via an indirect transmission of a control command to DAQ 104 relayed through vehicle scanner 106. Although the DAQ 104 is used as a destination device for ease of illustration with respect to FIG. 10, in other embodiments, display device 108 may transmit commands and/or data to vehicle scanner 106 via DAQ 104.

The process flow 1200 set forth in FIG. 12 describes in more detail how display device may transmit diagnostic communications to a destination diagnostic device, for example DAQ 104 in FIG. 10, via a relay diagnostic device, for example, vehicle scanner 106 in FIG. 10. FIG. 12 is exemplary in nature. Accordingly, although FIG. 12 illustrates a number of steps in a particular order, some steps could be executed in an order different than that set forth in FIG. 12. Furthermore, additional steps may be added to the operation 1200. Alternatively, a subset of the steps set forth in operation 1200 may be executed. The set of functions 1200 may be carried out via a custom designed ASIC within the display device 108, or may be carried out by one or more of processors 204 executing respective CRPIs that implement the functions of FIG. 12.

As set forth in step 1202, display device 108 first detects a command and/or data destined for a first diagnostic device, such as DAQ 104 in FIG. 10. The command may be, for example, a command requesting to begin remote control of DAQ 104, or may be data for display on the display 900 of DAQ 104 illustrating where to connect one of particular leads having their second end connected to one or more of ports 922, 924, and 926. Other types of diagnostic communications could be transmitted as well.

At step 1206, display device 108 determines whether it can directly wirelessly connect with DAQ 104. In accordance with the transmission range 1002 shown in the embodiment of FIG. 10, display device 108 can not directly wirelessly connect with display device 108. Display device 108 may be unable to directly wirelessly connect with DAQ 104 for any number of reasons. For example, DAQ 104 may have been moved outside of display device's 108 transmission range, display device 108 may have insufficient transmit power to reach DAQ 104, or perhaps another device in the vicinity is producing sufficient interference to reduce the range 1002 of display device's 108 transceiver 202. In some embodiments, method 1200 may not include step 1206, but rather may proceed from step 1202 directly to step 1208.

Next, at step 1208, display device 108 determines whether an indirect connection to DAQ 104 is available. Display device 108 may have prior knowledge that an indirect connection to DAQ 104 is available through vehicle scanner 106 after receiving a broadcast packet from vehicle scanner 106 indicating that it is within range of DAQ 104 and is available to relay packets to DAQ 104. Alternatively, display device 108 may transmit its own broadcast packet in step 1208, or prior to step 1208, requesting a response from any diagnostic device within its transmission range 1002 that is capable of relaying packets to DAQ 104. In response to receiving the broadcast packet, vehicle scanner 106 may reply by transmitting its own broadcast or unicast packet indicating that it is within range of DAQ 104 and is available to relay packets to DAQ 104.

The exchange of information between display device 108 and vehicle scanner 106 may also include additional information, such as battery source and/or battery power remaining. For example, in the event that vehicle scanner 106 is operating off of an external power source such as vehicle 102's battery, it may so indicate to display device 108 in a broadcast or unicast packet. Alternatively, in the event that vehicle scanner 106 is operating off of local battery power, it may so indicate to display device 108 in a broadcast or unicast packet, and may further indicate an estimated amount of battery power remaining.

In step 1210, display device 108 determines the best route to DAQ 104. In the event that only one of a direct wireless connection and an indirect wireless connection to DAQ 104 is available, display device 108 uses the one available connection. This may include a situation where display device 108 determines that a prior available direct connection with DAQ 104 has been interrupted. Responsive to detecting the interruption, display device 108 routes data indirectly to DAQ 104 via an indirect connection. Subsequently, responsive to determining that the direct wireless connection with the DAQ 104 has been restored, display device 108 may stop transmitting data via the indirect wireless connection and start transmitting data to DAQ 104 via the direct wireless connection.

As shown in FIG. 10, a direct wireless connection between DAQ 104 and display device 108 is not available due to transmission range limitations of the display device's 108 transceiver 202. Therefore, the only path to route diagnostic communications to DAQ 104 is via vehicle scanner 106, where vehicle scanner 106 acts as a relay agent to route the diagnostic communications to the display device 108 on behalf of the display device 108.

In an alternative embodiment, and in the event that transmission range 1002 of display device 108 reaches both vehicle scanner 106 and DAQ 104, display device 108 may take into account additional considerations in determining a best route to DAQ 104. For example, display device 108 may take into account the relative transmission power required to transmit directly to DAQ 104 and to transmit indirectly via vehicle scanner 106, and then transmit to the device that requires a lower transmission power.

Required transmission power could be determined in a number of ways. For example, display device 108 may transmit a packet requiring an acknowledgment to each of the DAQ 104 and the vehicle scanner 106 at ever increasing transmission power levels until the display device 108 receives an ACK frame from the respective device. The point at which an acknowledgment frame is received may provide an indication of a transmission power level needed to reach the diagnostic devices.

Alternatively, display device 108 may receive a packet from each of DAQ 104 and the vehicle scanner 106 that includes an indication of the power level that each packet was transmitted at. By measuring the power level of the received packet and the indication of the power level at which the packet was transmitted, display device 108 can make a determination of a transmission power level needed to reach each of the respective vehicle scanner 106 and DAQ 104. Other methods of calculating required transmission power levels could also be used.

An additional consideration that display device 108 may take into account is respective battery power source types and levels. For example, if display device 108 is running on battery power and display device 108 determines that vehicle scanner 106 is running on an external power source such as vehicle 102's battery, display device 108 may determine that the best route to display device 108 is through a shorter transmission path to vehicle scanner 106. This embodiment saves battery power at the display device 108 by utilizing the external power source available at vehicle scanner 106 to complete the transmission to DAQ 104.

Alternatively, if display device 108 determines that vehicle scanner 106 is also operating on a local battery power source, display device 108 may use relative battery power level information to determine the best route to DAQ 104. For example, if display device 108 is provided with battery level information from vehicle scanner 106 indicating that vehicle scanner 106's battery power level is at 50%, and display device 108 knows its own battery power level is at 90%, it may determine that the best route is to transmit directly to DAQ 104 despite the fact that a higher transmission power level will be required than to transmit indirectly via vehicle scanner 106. Assuming that the relative battery power levels are switched, and display device 108 knows its own battery power level is at 50% and the vehicle scanner 106 is operating on battery power having a power level at 90%, display device 108 may determine that the best route is to transmit indirectly via vehicle scanner 106. This embodiment saves battery power at the display device 108 by utilizing the higher battery power level available at vehicle scanner 106 to complete the transmission to DAQ 104.

At step 1212, display device 108 transmits the detected command and/or data to DAQ 104 via the determined best route. In the case of FIG. 10, the determined best route is to transmit the detected command and/or data to the DAQ 104 indirectly via the vehicle scanner 106 because that is the only route available. In other embodiments, and based on additional considerations and/or various re-arrangements of diagnostic devices, the determined best route could be an indirect or a direct wireless connection to DAQ 104, and could involve one or more intermediate relay devices.

Display device 108 may receive power via a local battery source, an AC adapter, or some other source. In an embodiment in which the transceiver 202 of display device 108 has a transmission range 1002 that extends to cover both the vehicle scanner 106 and DAQ 104, display device 108 may take into consideration its own power status and the power status of vehicle scanner 106 in transmitting commands and/or data to DAQ 104. For example, if display device 108 detects that it is operating on external power via an AC adapter, it may determine that the best route to DAQ 104 is to wirelessly transmit commands and/or data directly to DAQ 104, regardless of the power status of vehicle scanner 106. On the other hand, if display device 108 is operating off of a local battery power source, it may obtain power status information from vehicle scanner 106 prior to determining a best route to DAQ 104 and take the power status into consideration in determining the best route.

For example, if display device 108 is provided with battery level information from vehicle scanner 106 indicating that its battery power level is at 50%, and display device 108 knows its own battery power level is at 90%, it may determine that the best route is to transmit directly to DAQ 104 despite the fact that a higher transmission power level will be required than to transmit indirectly via vehicle scanner 106. Assuming that the relative battery power levels are switched, and display device 108 knows its own battery power level is at 50% and the vehicle scanner 106 is operating on battery power having a power level at 90%, display device 108 may determine that the best route is to transmit indirectly via vehicle scanner 106. This embodiment saves battery power at the display device 108 by utilizing the higher battery power level available at vehicle scanner 106 to complete the transmission to DAQ 104.

III. Conclusion

Example embodiments of the present invention have been described above. Those skilled in the art will understand that changes and modifications may be made to the described embodiments without departing from the true scope and spirit of the present invention, which is defined by the claims.

We claim:

1. A method performed by a diagnostic device, the method comprising:
   determining that a direct wireless connection between the diagnostic device and a display device is available and that an indirect wireless connection between the diagnostic device and the display device is available using a diagnostic apparatus as an intermediary;
   determining that the diagnostic device is consuming power provided by a first battery of the diagnostic device and that the diagnostic apparatus is consuming power provided by a second battery of the diagnostic apparatus;
   receiving vehicle data from a vehicle under test;
   receiving, from the diagnostic apparatus, a communication indicating a second battery level of the second battery;
   determining whether a first battery level of the first battery is greater than the second battery level based on the indicated second battery level;
   selecting either the direct wireless connection or the indirect wireless connection for transmitting the received vehicle data to the display device based on determining whether the first battery level of the first battery is greater than the second battery level of the second battery; and
   transmitting, to the display device, the received vehicle data using the selected wireless connection.

2. The method of claim 1, further comprising:
   determining that the first battery level is greater than the second battery level,
   wherein selecting either the direct wireless connection or the indirect wireless connection comprises selecting the direct wireless connection.

3. The method of claim 1, further comprising:
   determining that the second battery level is greater than the first battery level,
   wherein selecting either the direct wireless connection or the indirect wireless connection comprises selecting the indirect wireless connection.

4. The method of claim 1, further comprising:
   determining that a first transmission power level required to transmit the vehicle data to the display device using the direct wireless connection is less than a second transmission power level required to transmit the vehicle data to the display deice using the indirect wireless connection,
   wherein selecting either the direct wireless connection or the indirect wireless connection comprises selecting the direct wireless connection based on determining that the first transmission power level is less than the second transmission power level.

5. The method of claim 1, further comprising:
   determining that a second transmission power level required to transmit the vehicle data to the display device using the indirect wireless connection is less than a first transmission power level required to transmit the vehicle data to the display device using the direct wireless connection,
   wherein selecting either the direct wireless connection or the indirect wireless connection comprises selecting the indirect wireless connection based on determining that the second transmission power level is less than the first transmission power level.

6. The method of claim 1, further comprising:
   transmitting to the diagnostic apparatus and the display device at iteratively increasing transmission power levels until the diagnostic device receives an acknowledgment from the diagnostic apparatus and an acknowledgment from the display device;
   determining a second transmission power level required to transmit the vehicle data to the display device using the indirect wireless connection after the diagnostic device receives the acknowledgment from the diagnostic apparatus; and
   determining a first transmission power level required to transmit the vehicle data to the display device using the direct wireless connection after the diagnostic device receives the acknowledgment from the display device
   wherein selecting either the direct wireless connection or the indirect wireless connection comprises selecting either the direct wireless connection or the indirect wireless connection based on the determined first transmission power level and the determined second transmission power level.

7. The method of claim 1, further comprising:
   receiving, from the diagnostic apparatus, a first indication of a first received power level at which the diagnostic apparatus received a packet transmitted by the diagnostic device,
   receiving, from the display device, a second indication of a second received power level at which the display device received a packet transmitted by the diagnostic device, and
   determining, using the first indication and the second indication, a first transmission power level required to transmit the vehicle data to the display device using the direct wireless connection and a second transmission power level required to transmit the vehicle data to the display device using the indirect wireless connection,
   wherein selecting either the direct wireless connection or the indirect wireless connection comprises selecting either the direct wireless connection or the indirect wireless connection based on the determined first transmission power level and the determined second transmission power level.

8. A diagnostic device comprising:
   a processor; and
   a non-transitory computer-readable medium storing program instructions executable by the processor to cause the diagnostic device to perform functions comprising:
   determining that a direct wireless connection between the diagnostic device and a display device is available and that an indirect wireless connection between the diagnostic device and the display device is available using a diagnostic apparatus as an intermediary;
   determining that the diagnostic device is consuming power provided by a first battery of the diagnostic device and that the diagnostic apparatus is consuming power provided by a second battery of the diagnostic apparatus;
   receiving vehicle data from a vehicle under test;
   receiving, from the diagnostic apparatus, a communication indicating a second battery level of the second battery;

determining whether a first battery level of the first battery is greater than the second battery level based on the indicated second battery level;

selecting either the direct wireless connection or the indirect wireless connection for transmitting the received vehicle data to the display device based on determining whether the first battery level of the first battery is greater than the second battery level of the second battery; and transmitting, to the display device, the received vehicle data using the selected wireless connection.

9. The diagnostic device of claim 8, wherein the functions further comprise:

determining that the first battery level is greater than the second battery level, wherein selecting either the direct wireless connection or the indirect wireless connection comprises selecting the direct wireless connection.

10. The diagnostic device of claim 8, wherein the functions further comprise:

determining that the second battery level is greater than the first battery level, wherein selecting either the direct wireless connection or the indirect wireless connection comprises selecting the indirect wireless connection.

11. The diagnostic device of claim 8, wherein the functions further comprise:

determining that a first transmission power level required to transmit the vehicle data to the display device using the direct wireless connection is less than a second transmission power level required to transmit the vehicle data to the display device using the indirect wireless connection, wherein selecting either the direct wireless connection or the indirect wireless connection comprises selecting the direct wireless connection based on determining that the first transmission power level is less than the second transmission power level.

12. The diagnostic device of claim 8, wherein the functions further comprise:

determining that a second transmission power level required to transmit the vehicle data to the display device using the indirect wireless connection is less than a first transmission power level required to transmit the vehicle data to the display device using the direct wireless connection, wherein selecting either the direct wireless connection or the indirect wireless connection comprises selecting the indirect wireless connection based on determining that the second transmission power level is less than the first transmission power level.

13. The diagnostic device of claim 8, wherein the functions further comprise:

transmitting to the diagnostic apparatus and the display device at iteratively increasing transmission power levels until the diagnostic device receives an acknowledgment from the diagnostic apparatus and an acknowledgment from the display device;

determining a second transmission power level required to transmit the vehicle data to the display device using the indirect wireless connection after the diagnostic device receives the acknowledgment from the diagnostic apparatus; and determining a first transmission power level required to transmit the vehicle data to the display device using the direct wireless connection after the diagnostic device receives the acknowledgment from the display device, wherein selecting either the direct wireless connection or the indirect wireless connection comprises selecting either the direct wireless connection or the indirect wireless connection based on the determined first transmission power level and the determined second transmission power level.

14. The diagnostic device of claim 8, wherein the functions further comprise:

receiving, from the diagnostic apparatus, a first indication of a first received power level at which the diagnostic apparatus received a packet transmitted by the diagnostic device, receiving, from the display device, a second indication of a second received power level at which the display device received a packet transmitted by the diagnostic device, and determining, using the first indication and the second indication, a first transmission power level required to transmit the vehicle data to the display device using the direct wireless connection and a second transmission power level required to transmit the vehicle data to the display device using the indirect wireless connection, wherein selecting either the direct wireless connection or the indirect wireless connection comprises selecting either the direct wireless connection or the indirect wireless connection based on the determined first transmission power level and the determined second transmission power level.

15. A non-transitory computer-readable medium storing program instructions executable by a diagnostic device to cause the diagnostic device to perform functions comprising:

determining that a direct wireless connection between the diagnostic device and a display device is available and that an indirect wireless connection between the diagnostic device and the display device is available using a diagnostic apparatus as an intermediary;

determining that the diagnostic device is consuming power provided by a first battery of the diagnostic device and that the diagnostic apparatus is consuming power provided by a second battery of the diagnostic apparatus;

receiving vehicle data from a vehicle under test;

receiving, from the diagnostic apparatus, a communication indicating a second battery level of the second battery;

determining whether a first battery level of the first battery is greater than the second battery level based on the indicated second battery level;

selecting either the direct wireless connection or the indirect wireless connection for transmitting the received vehicle data to the display device based on determining whether the first battery level of the first battery is greater than the second battery level of the second battery; and transmitting, to the display device, the received vehicle data using the selected wireless connection.

16. The non-transitory computer-readable medium of claim 15, wherein the functions further comprise:

determining that the first battery level is greater than the second battery level, wherein selecting either the direct wireless connection or the indirect wireless connection comprises selecting the direct wireless connection.

17. The non-transitory computer-readable medium of claim 15, wherein the functions further comprise:

determining that the second battery level is greater than the first battery level, wherein selecting either the direct wireless connection or the indirect wireless connection comprises selecting the indirect wireless connection.

18. The non-transitory computer-readable medium of claim 15, wherein the functions further comprise:

determining that a first transmission power level required to transmit the vehicle data to the display device using the direct wireless connection is less than a second transmission power level required to transmit the vehicle data to the display device using the indirect wireless connection, wherein selecting either the direct wireless connection or the indirect wireless connection comprises selecting the direct wireless connection based on determining that the first transmission power level is less than the second transmission power level.

19. The non-transitory computer-readable medium of claim 15, wherein the functions further comprise:

determining that a second transmission power level required to transmit the vehicle data to the display device using the indirect wireless connection is less than a first transmission power level required to transmit the vehicle data to the display device using the direct wireless connection, wherein selecting either the direct wireless connection or the indirect wireless connection comprises selecting the indirect wireless connection based on determining that the second transmission power level is less than the first transmission power level.

20. The non-transitory computer-readable medium of claim 15, wherein the functions further comprise:

transmitting to the diagnostic apparatus and the display device at iteratively increasing transmission power levels until the diagnostic device receives an acknowledgment from the diagnostic apparatus and an acknowledgment from the display device;

determining a second transmission power level required to transmit the vehicle data to the display device using the indirect wireless connection after the diagnostic device receives the acknowledgment from the diagnostic apparatus; and determining a first transmission power level required to transmit the vehicle data to the display device using the direct wireless connection after the diagnostic device receives the acknowledgment from the display device, wherein selecting either the direct wireless connection or the indirect wireless connection comprises selecting either the direct wireless connection or the indirect wireless connection based on the determined first transmission power level and the determined second transmission power level.

21. The non-transitory computer-readable medium of claim 15, wherein the functions further comprise:

receiving, from the diagnostic apparatus, a first indication of a first received power level at which the diagnostic apparatus received a packet transmitted by the diagnostic device, receiving, from the display device, a second indication of a second received power level at which the display device received a packet transmitted by the diagnostic device, and determining, using the first indication and the second indication, a first transmission power level required to transmit the vehicle data to the display device using the direct wireless connection and a second transmission power level required to transmit the vehicle data to the display device using the indirect wireless connection, wherein selecting either the direct wireless connection or the indirect wireless connection comprises selecting either the direct wireless connection or the indirect wireless connection based on the determined first transmission power level and the determined second transmission power level.

\* \* \* \* \*